US009731641B2

United States Patent
Colantonio et al.

(10) Patent No.: US 9,731,641 B2
(45) Date of Patent: Aug. 15, 2017

(54) TILTING PLATFORM FOR STABILITY CONTROL

(71) Applicant: Amazon Technologies, Inc., Seattle, WA (US)

(72) Inventors: Peter Thomas Colantonio, North Andover, MA (US); Allan Andrew Katz, Manchester, NH (US); Parris S. Wellman, Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/418,540

(22) Filed: Jan. 27, 2017

(65) Prior Publication Data

US 2017/0136931 A1     May 18, 2017

Related U.S. Application Data

(63) Continuation of application No. 14/750,676, filed on Jun. 25, 2015, now Pat. No. 9,586,510.

(51) Int. Cl.
| | |
|---|---|
| *G06F 7/00* | (2006.01) |
| *B60P 1/02* | (2006.01) |
| *B66F 9/065* | (2006.01) |
| *A47F 5/00* | (2006.01) |
| *G05D 1/02* | (2006.01) |

(52) U.S. Cl.
CPC .............. *B60P 1/02* (2013.01); *A47F 5/0018* (2013.01); *B66F 9/065* (2013.01); *G05D 1/021* (2013.01)

(58) Field of Classification Search
USPC ......................................................... 700/217
See application file for complete search history.

(56) References Cited

U.S. PATENT DOCUMENTS

| | | | | |
|---|---|---|---|---|
| 7,850,413 | B2 * | 12/2010 | Fontana | B66F 3/08 414/331.14 |
| 8,220,710 | B2 * | 7/2012 | Hoffman | G06Q 10/087 235/375 |
| 8,280,547 | B2 | 10/2012 | D'Andrea et al. | |
| 8,918,202 | B2 * | 12/2014 | Kawano | G05D 1/0234 700/213 |

(Continued)

FOREIGN PATENT DOCUMENTS

| | | |
|---|---|---|
| DE | 102013013438 A1 | 2/2015 |
| WO | WO2007149227 A2 | 12/2007 |
| WO | WO2016/209965 A1 | 12/2016 |

OTHER PUBLICATIONS

PCT/US2016/038768 , "International Search Report and Written Opinion", Oct. 6, 2016, 10 pages.

*Primary Examiner* — Kyle Logan
(74) *Attorney, Agent, or Firm* — Kilpatrick Townsend & Stockton LLP

(57) ABSTRACT

A mobile drive unit including a docking head assembly is provided. The docking head assembly is configured with a set of actuator assemblies to lift an holder structure and tilt the holder structure in at least one direction. The direction of tilt and an associated angle may be determined based on a location of a center of gravity of the holder structure relative to the mobile drive unit. The direction of tilt and the associated angle may also be determined based on information describing external forces acting on the holder structure.

20 Claims, 11 Drawing Sheets

(56) References Cited

U.S. PATENT DOCUMENTS

| | | | |
|---|---|---|---|
| 2012/0143427 A1* | 6/2012 | Hoffman | G06Q 10/087 701/23 |
| 2013/0302132 A1* | 11/2013 | D'Andrea | G06Q 10/08 414/807 |
| 2014/0058556 A1* | 2/2014 | Kawano | G05D 1/0234 700/216 |
| 2016/0167557 A1 | 6/2016 | Mecklinger | |
| 2016/0236869 A1* | 8/2016 | Kimura | G05D 1/0291 |
| 2016/0375813 A1 | 12/2016 | Colantonio et al. | |

* cited by examiner

TILTING PLATFORM FOR STABILITY CONTROL

CROSS-REFERENCES TO RELATED APPLICATIONS

This application is a continuation of U.S. patent application Ser. No. 14/750,676, filed Jun. 25, 2015, and issued to U.S. Pat. No. 9,586,510 on Mar. 7, 2017, entitled "TILTING PLATFORM FOR STABILITY CONTROL," and is related to International Application No. PCT/US16/38768, filed Jun. 22, 2016, entitled "TILTING PLATFORM FOR STABILITY CONTROL," both of which are incorporated herein by reference in their entireties.

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, as modern inventory systems continue to increase in size and complexity, the likelihood that some inventory items will become lost within the inventory systems increases. These items may be lost as they are transferred into the inventory systems, as they move throughout the inventory systems, or as they move out of the inventory systems. Lost inventory items may impact operating budgets associated with these inventory systems and may also affect efficiency.

BRIEF DESCRIPTION OF THE DRAWINGS

Various embodiments in accordance with the present disclosure will be described with reference to the drawings, in which.

DETAILED DESCRIPTION

Figure 1:
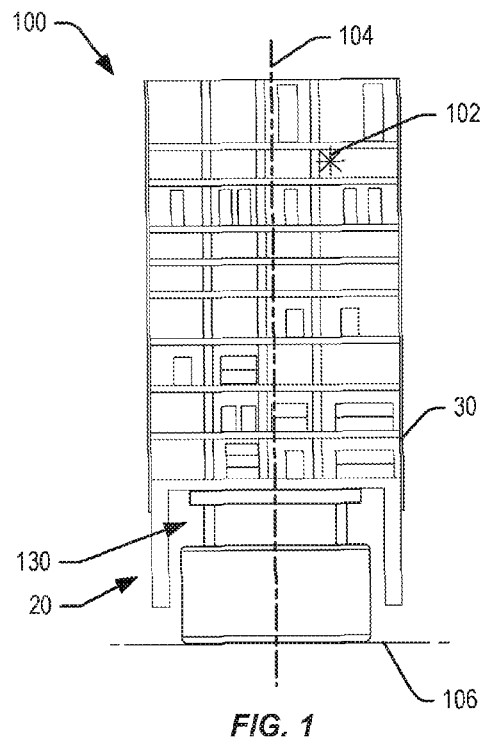
FIGS. 1-4 illustrate example inventory movement systems including example mobile drive units and example inventory holders depicting techniques relating to tilting inventory holders for stability control as described herein, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system including an inventory movement system for increased stability in the movement of inventory. In particular, the inventory movement system may include a mobile drive unit configured to move an inventory holder and to account for characteristics of the inventory holder and to account for various forces acting on the inventory holder in order to increase stability of the inventory holder and to change operational characteristics of the mobile drive unit (e.g., to increase traction of the mobile drive unit). For example, a location of a center of gravity of the inventory holder may be translated by adjusting a mounting angle of the inventory holder relative to the mobile drive unit. Moving the location of the center of gravity closer to a center of gravity of the mobile drive unit, which may be represented as a centerline of the mobile drive unit, may increase the stability of the inventory movement system. This may be because doing so balances moments in the inventory movement system resulting in a neutral stability condition. In some examples, moving the location of the center of gravity may affect operational characteristics of the mobile drive unit. For example, the center of gravity may be shifted to provide increased traction to one or more wheels of the mobile drive unit as the mobile drive unit negotiates a turn. Such movement of the center of gravity may be dynamic and performed in real-time. In some examples, the mounting angle may be determined in a manner that maximizes traction or other operational characteristics of the mobile drive unit.

The mounting angle may be statically or dynamically adjusted when the mobile drive unit couples to the inventory holder. The mounting angle may also be dynamically adjusted to account for acceleration and deceleration of the mobile drive and to account for angular variations in a surface on which the mobile drive unit operates (e.g., ramps, bumps, or any other angular variations). Adjustment of the mounting angle may include tilting in the forward and backward directions and tilting in the right and left directions, or any combinations of these directions. In this manner, the inventory holder may be tilted in at least four different directions.

Turning now to a particular example, in this example, a mobile drive unit operating in an inventory system may be instructed to lift an inventory holder off of the ground via a docking head assembly. The docking head assembly may include a platform attached to a frame of the mobile drive unit via two or more actuators. The platform may be raised by the actuators into engagement with the inventory holder in order to lift the inventory holder off of the ground. Information regarding a location of a center of gravity of the inventory holder may be received. For example, the docking head assembly may include sensors on a top surface of the platform which may output the information. The location of the center of gravity of the inventory holder may be determined from the information. If the determined location of the center of gravity of the inventory holder would result in the inventory holder and mobile drive unit being unbalanced, the platform may be tilted relative to the mobile drive unit to account for the location of the center of gravity of the inventory holder. The tilting of the platform may move the location of the center of gravity of the inventory holder to a more desirable location relative to the mobile drive unit. The platform may be tilted by instructing one or more of the actuators to raise or lower portions of the platform. For example, a front portion of the platform may be lowered and a rear portion may be raised. The platform may also be tilted to account for inertial forces that may act on the inventory holder as it is moved by the mobile drive unit, or to affect any other operational characteristics of the mobile drive unit.

Turning now to the figures, FIGS. 1-4 illustrate example inventory movement systems including example mobile drive units and example inventory holders depicting techniques relating to tilting inventory holders for stability control as described herein, according to certain embodiments. In particular, FIG. 1 illustrates inventory movement system 100. The inventory movement system 100 may include a mobile drive unit 20 and an inventory holder 30 in a static condition (i.e., not moving). As described in more detail herein, the mobile drive unit 20 may be configured to detachably couple to the inventory holder 30 via a docking head assembly 130. In FIGS. 1-4, the mobile drive unit 20 and the inventory holder 30 are detachably coupled together via the docking head assembly 130. The mobile drive unit 20 may be configured to operate autonomously or semi-autonomously.

The inventory holder 30 may have a center of gravity 102. In some examples, a location of the center of gravity 102 may be determined from inventory information, i.e., information describing the inventory held within the inventory holder 30 or from sensing information, i.e., information describing aspects of the inventory holder 30 in terms of forces exerted by the inventory holder 30 on components of the docking head assembly 130 or mobile drive unit 20. In some examples, the center of gravity 102 may be described in terms relative to a centerline 104 of the inventory movement system 100 (e.g., 6 inches behind the center line or 6 inches to the side of the centerline), which may correspond to an X and Y location of a center of gravity of the mobile drive unit 20 or the inventory movement system 100. In some examples, the centerline 104 may represent a mathematical or dimensional center of the mobile drive unit 20, and, in some examples, may represent a center of gravity of the mobile drive unit 20, which may be determined based on components of the mobile drive unit 20, and may be different from the mathematical center. In any event, the centerline 104 may represent a balance line of the inventory movement system 100. Thus, in the static condition illustrated in FIG. 1, the center of gravity 102 is located offset from the centerline 104. This may mean that the inventory movement system 100 is unbalanced or may otherwise be less stable than ideal. For example, because of the location of the center of gravity 102 relative to the centerline 104, even in a static condition, the inventory holder 30 may be prone to toppling over, i.e., to the right in FIG. 1. This tendency to topple over may be magnified as the mobile drive unit 20 begins to move the inventory holder 30 in a direction along surface 106, i.e., to the left in FIG. 1. Such movement may introduce a rotational force which may cause the inventory holder 30 to topple or otherwise be unstable.

Figure 2:
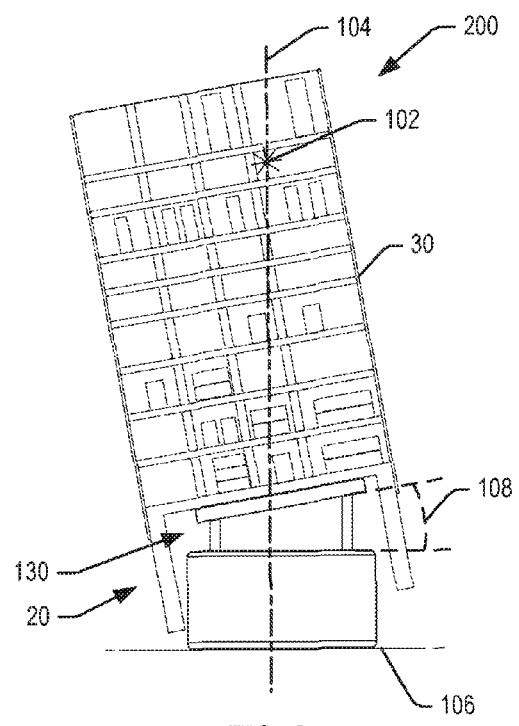

FIG. 2 illustrates inventory movement system 200, which may be an example of the inventory movement system 100 after the inventory holder 30 has been rotated in a static condition. The rotation of the inventory holder 30 may have resulted in the location of the center of gravity 102 being translated to a position that is closer to the centerline 104 compared to the inventory movement system 100. In some examples, rotation of the inventory holder 30 may be achieved by components of the docking head assembly 130 rotating or tilting relative to the mobile drive unit 20. For example, in the inventory movement system 100, a mounting angle may be zero because a bottom surface of the inventory holder 30 is approximately parallel with a top surface of the mobile drive unit 20, excluding the docking head assembly 130. In the inventory movement system 200, a first adjusted mounting angle 108 may be greater than zero because the bottom surface of the inventory holder 30 has been rotated relative to the top surface of the mobile drive unit 20. In FIG. 2, because the inventory holder 30 has been rotated through the first adjusted mounting angle 108, the center of gravity 102 of the inventory holder 30 may be translated to a different position relative to the mobile drive unit 20 than in FIG. 1. In particular, the center of gravity 102 may be located nearer to the centerline 104 than in FIG. 1. This may, in some examples, result in the inventory movement system 200 being more stable than the inventory movement system 100. In some examples, the first adjusted mounting angle 108 may be determined in accordance with techniques described herein.

Figure 3:
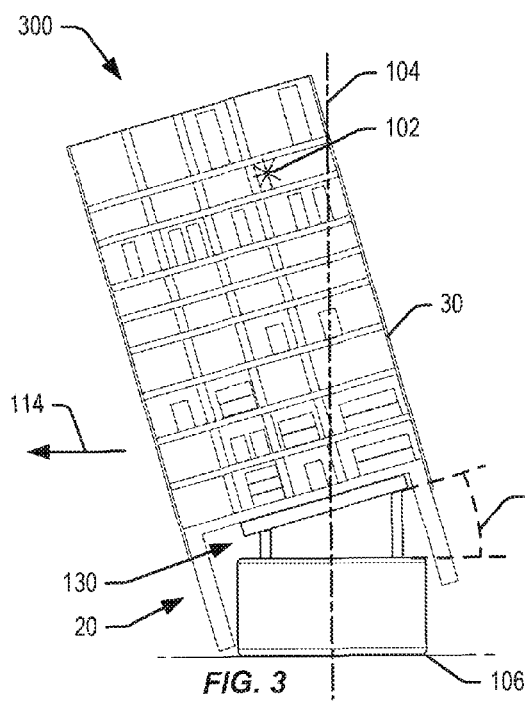

FIG. 3 illustrates inventory movement system 300, which may be an example of the inventory movement system 100 after the inventory holder 30 has been rotated to account for dynamic conditions and/or static conditions. For example, such rotation may be desirable to account for acceleration of the inventory movement system 300 in the direction of arrow 114, i.e., to the left in FIG. 3. Such acceleration in the direction of the arrow 114 may result in a force in an opposite direction that is exerted on the inventory holder 30 and may cause the inventory holder 30 to tend to topple over. To account for this force, the inventory holder 30 may be rotated through a second adjusted mounting angle 111 such that the center of gravity 102 is translated to a position that is offset from the centerline 104 toward the direction of arrow 114, i.e., to the left of the centerline 104 in FIG. 3. The inventory holder 30 may also be rotated in an opposite direction to account for deceleration of the inventory movement system 300. In some examples, the determination of the second adjusted mounting angle 111 may be determined and executed in a dynamic manner. For example, as the mobile drive unit 20 moves the inventory holder 30 along the surface 106, the second adjusted mounting angle 111 may be increased and decreased to account for the location of the center of gravity 102 and deceleration and acceleration of the mobile drive unit 20.

Figure 4:
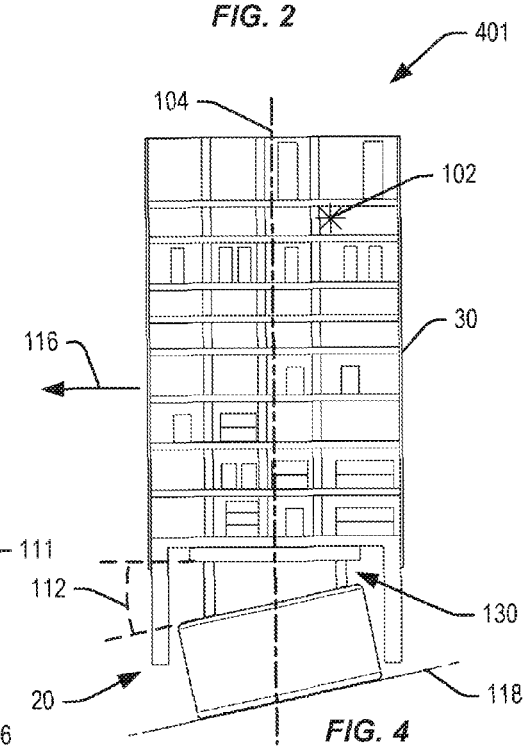

FIG. 4 illustrates inventory movement system 401, which may be an example of the inventory movement system 100 after the inventory holder 30 has been rotated to account for dynamic conditions and/or static conditions. For example, such rotation may be desirable to account for angular variations of a declined surface 118. For example, in FIG. 4, as the mobile drive unit 20 moves the inventory holder 30 along the declined surface 118 in the direction of arrow 116, the inventory holder 30 may tend to want to topple down the declined surface 118, i.e., in the direction of the arrow 116. However, in this example, the inventory holder 30 has been rotated through a third adjusted mounting angle 112 to account for the forces acting on the inventory holder 30 as it is moved down the declined surface 118. In some examples, the third adjusted mounting angle 112 may also be determined dynamically and in a manner that accounts for acceleration and/or deceleration of the inventory movement system 401 as the inventory movement system 401 moves down (or up) the declined surface 118. In FIGS. 2-4, the adjusted mounting angles are shown in particular directions. In some examples, however, adjusted mounting angles may be determined that rotate the inventory holder 30 in any of forward, backward, leftward or rightward directions, or any combinations thereof, relative to the direction of travel. Because the inventory holder 30 is a three-dimensional object, the location of the center of gravity 102 will also have three dimensions. Thus, adjusted mounting angles may be determined to rotate the inventory holder 30 in at least two of the three dimensions (e.g., X-direction and Y-direction). In some examples, such compound rotation may be desirable to account for the location of the center of gravity 102, bumps or changes in a surface on which the mobile drive unit 20 operates, turns and curves, ramps, or any other angular variations which may be encountered by the mobile drive unit 20 at a constant speed, an increasing acceleration, or a decreasing acceleration.

Figure 5:
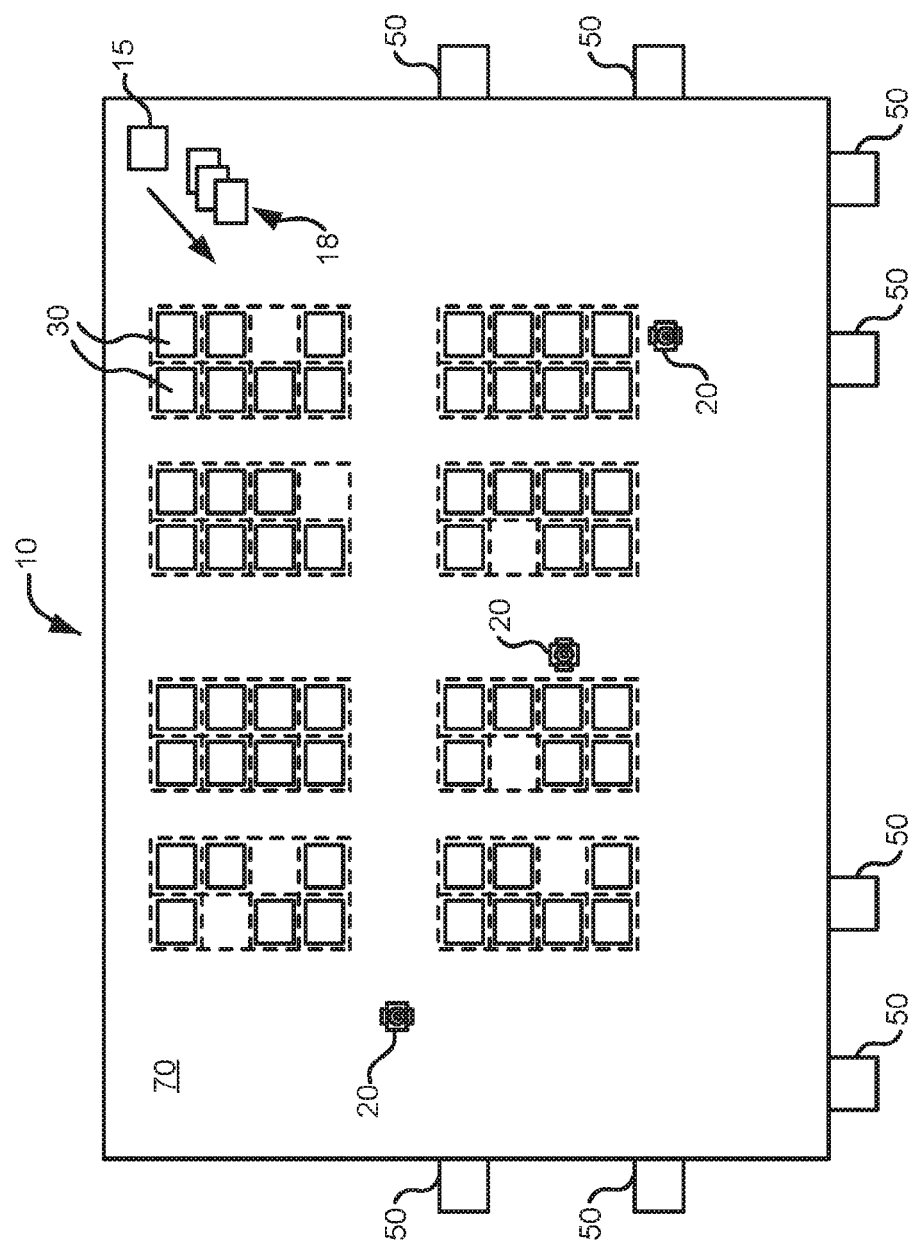
FIG. 5 illustrates components of an inventory system, according to at least one embodiment.

FIG. 5 illustrates the components of an inventory system 10 in which the inventory movement systems 100, 200, 300, and 401 may operate. The inventory system 10 may include a management module 15, one or more mobile drive units 20, one or more inventory holders 30, and one or more inventory stations 50. The mobile drive units 20 transport the inventory holders 30 between points within a workspace 70 in response to commands communicated by the management module 15. Each of the inventory holders 30 may be configured with one or more compartments for containing one or more inventory items. In some examples, the inventory holders 30 may be inventory holders configured to hold one or more containers which may hold inventory items. Thus, the inventory system 10 may be capable of moving inventory items between locations within the workspace 70 to facilitate the entry, processing, and/or removal of inventory items from the inventory system 10 and the completion of other tasks involving inventory items.

The management module 15 may assign tasks to appropriate components of the inventory system 10 and coordinate operation of the various components in completing the tasks. These tasks may relate not only to the movement and processing of inventory items, but also to the management and maintenance of the components of the inventory system 10. For example, the management module 15 may assign portions of the workspace 70 as parking spaces for the mobile drive units 20, the scheduled recharge or replacement of mobile drive unit batteries, the storage of the inventory holders 30, or any other operations associated with the functionality supported by the inventory system 10 and its various components. The management module 15 may select components of the inventory system 10 to perform these tasks and communicate appropriate commands and/or data to the selected components to facilitate completion of these operations. Although shown in FIG. 5 as a single, discrete component, the management module 15 may represent multiple components and may represent or include portions of the mobile drive units 20 or other components of the inventory system 10. As a result, any or all of the interaction between a particular mobile drive unit 20 and the management module 15 that is described below may, in particular embodiments, represent peer-to-peer communication between that mobile drive unit 20 and one or more other mobile drive units 20. The components and operation of an example embodiment of the management module 15 are discussed further below with respect to FIG. 6. In some examples, the management module 15 may be distributed between a server and the mobile drive units 20. In this example, the server may provide instructions to the mobile drive units 20 which may process the instructions and generate other instructions to manage components of the mobile drive units 20. In some examples, the management module 15 may include any suitable combination of analog and digital components configured to implement the techniques described herein. For example, the management module 15 may include an analog controller configured to control certain aspects of the operation of the mobile drive unit (e.g., adjusting a mounting angle of the inventory holder 30 relative to the mobile drive unit 20 to account for the distribution of mass of the inventory holder 30, to account for the location of a center of gravity of the inventory holder 30, to account for movement of inventory items in the inventory holder 30, to account for movement of the inventory holder 30 when coupled to the mobile drive unit 20, or to account for any other condition affecting stability of the inventory holder 30).

The mobile drive units 20 may move the inventory holders 30 between locations within the workspace 70. The mobile drive units 20 may represent any devices or components appropriate for use in the inventory system 10 based on the characteristics and configuration of the inventory holders 30 and/or other elements of the inventory system 10. In a particular embodiment of the inventory system 10, the mobile drive units 20 represent independent, self-powered devices configured to freely move about the workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280, 547, issued on Oct. 2, 2012, titled "METHOD AND SYSTEM FOR TRANSPORTING INVENTORY ITEMS", the entire disclosures of which are herein incorporated by reference. In alternative embodiments, the mobile drive units 20 represent elements of a tracked inventory system configured to move the inventory holders 30 along tracks, rails, cables, crane system, or other guidance or support elements traversing the workspace 70. In such an embodiment, the mobile drive units 20 may receive power and/or support through a connection to the guidance elements, such as a powered rail. Additionally, in particular embodiments of the inventory system 10, the mobile drive units 20 may be configured to utilize alternative conveyance equipment to move within the workspace 70 and/or between separate portions of the workspace 70. The components and operation of an example embodiment of a mobile drive unit 20 are discussed further below with respect to FIGS. 7 and 8.

Additionally, the mobile drive units 20 may be capable of communicating with the management module 15 to receive information identifying selected inventory holders 30, transmit the locations of the mobile drive units 20, or exchange any other suitable information to be used by the management module 15 or the mobile drive units 20 during operation. The mobile drive units 20 may communicate with the management module 15 wirelessly, using wired connections between the mobile drive units 20 and the management module 15, and/or in any other appropriate manner. As one example, particular embodiments of the mobile drive unit 20 may communicate with the management module 15 and/or with one another using 802.11, Bluetooth, or Infrared Data Association (IrDA) standards, or any other appropriate wireless communication protocol. As another example, in a tracked inventory system 10, tracks or other guidance elements upon which the mobile drive units 20 move may be wired to facilitate communication between the mobile drive units 20 and other components of the inventory system 10. Furthermore, as noted above, the management module 15 may include components of individual mobile drive units 20. Thus, for the purposes of this description and the claims that follow, communication between the management module 15 and a particular mobile drive unit 20 may represent communication between components of a particular mobile drive unit 20. In general, the mobile drive units 20 may be powered, propelled, and controlled in any manner appropriate based on the configuration and characteristics of the inventory system 10.

In some examples, the inventory holders 30 may store inventory items within containers. In a particular embodiment, the inventory holders 30 may include multiple storage shelves with each storage shelf capable of holding one or more containers. Within each container may be held one or more types of inventory items. The inventory holders 30 are capable of being carried, rolled, and/or otherwise moved by the mobile drive units 20. In particular embodiments, the inventory holder 30 may provide additional propulsion to supplement that provided by the mobile drive unit 20 when moving the inventory holder 30. In some examples, the inventory holders 30 may store inventory items within one or more storage bins.

Additionally, in particular embodiments, inventory items 40 may also hang from hooks or bars (not shown) within or on the inventory holder 30. In general, the inventory holder 30 may store the inventory items 40 in any appropriate manner within the inventory holder 30 and/or on the external surface of the inventory holder 30.

Additionally, each inventory holder 30 may include a plurality of faces. In some examples, each container may be accessible through one or more faces of the inventory holder 30. For example, in a particular embodiment, the inventory holder 30 includes four faces. In such an embodiment, containers located at a corner of two faces may be accessible through either of those two faces, while each of the other containers is accessible through an opening in one of the four faces. The mobile drive unit 20 may be configured to rotate the inventory holder 30 at appropriate times to present a particular face and the containers accessible from that face to an operator or other components of the inventory system 10.

Inventory items represent any objects suitable for storage, retrieval, and/or processing in an automated inventory system 10. For the purposes of this description, "inventory items" may represent any one or more objects of a particular type that are stored in the inventory system 10. Thus, a particular inventory holder 30 is currently "storing" a particular inventory item if the inventory holder 30 currently holds one or more units of that type. As one example, the inventory system 10 may represent a mail order warehouse facility, and inventory items may represent merchandise stored in the warehouse facility. During operation, the mobile drive units 20 may retrieve the inventory holders 30 containing one or more inventory items requested in an order to be packed for delivery to a customer or the inventory holders 30 carrying pallets containing aggregated collections of inventory items for shipment. Moreover, in particular embodiments of the inventory system 10, boxes containing completed orders may themselves represent inventory items.

In particular embodiments, the inventory system 10 may also include one or more inventory stations 50. The inventory stations 50 represent locations designated for the completion of particular tasks involving inventory items. Such tasks may include the removal of inventory items and/or containers from the inventory holders 30, the introduction of inventory items and/or containers into the inventory holders 30, the counting of inventory items and/or containers in the inventory holders 30, the decomposition of inventory items (e.g. from pallet- or case-sized groups to individual inventory items) into containers in the inventory holders 30, the consolidation of inventory items and/or containers between the inventory holders 30, transfer of inventory items and/or containers between the inventory holders 30, and/or the processing or handling of inventory items in any other suitable manner. In particular embodiments, the inventory stations 50 may just represent the physical locations where a particular task involving inventory items can be completed within the workspace 70. In alternative embodiments, the inventory stations 50 may represent both the physical location and also any appropriate equipment for processing or handling inventory items, such as scanners for monitoring the flow of inventory items in and out of the inventory system 10, communication interfaces for communicating with the management module 15, and/or any other suitable components. The inventory stations 50 may be controlled, entirely or in part, by human operators or may be fully automated. Moreover, the human or automated operators of the inventory stations 50 may be capable of performing certain tasks to inventory items, such as packing, counting, or transferring inventory items, as part of the operation of the inventory system 10.

The workspace 70 represents an area associated with the inventory system 10 in which the mobile drive units 20 can move and/or the inventory holders 30 can be stored. For example, the workspace 70 may represent all or part of the floor of a mail-order warehouse in which the inventory system 10 operates. Although FIG. 5 shows, for the purposes of illustration, an embodiment of the inventory system 10 in which the workspace 70 includes a fixed, predetermined, and finite physical space, particular embodiments of the inventory system 10 may include the mobile drive units 20 and the inventory holders 30 that are configured to operate within a workspace 70 that is of variable dimensions and/or an arbitrary geometry. While FIG. 5 illustrates a particular embodiment of the inventory system 10 in which the workspace 70 is entirely enclosed in a building, alternative embodiments may utilize workspaces 70 in which some or all of the workspace 70 is located outdoors, within a vehicle (such as a cargo ship), located across more than one floor, or otherwise unconstrained by any fixed structure.

In operation, the management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of the mobile drive units 20, the inventory holders 30, the inventory stations 50 and other components of the inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, the management module 15 generates the task assignments 18 based, in part, on inventory requests that the management module 15 receives from other components of the inventory system 10 and/or from external components in communication with the management module 15. These inventory requests identify particular operations to be completed involving inventory items stored or to be stored within the inventory system 10 and may represent communication of any suitable form. For example, in particular embodiments, an inventory request may represent a shipping order specifying particular inventory items that have been purchased by a customer and that are to be retrieved from the inventory system 10 for shipment to the customer. The management module 15 may also generate the task assignments 18 independently of such inventory requests, as part of the overall management and maintenance of the inventory system 10. For example, the management module 15 may generate the task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of the inventory system 10. After generating one or more task assignments 18, management module 15 transmits the generated task assignments 18 to appropriate components for completion of the corresponding task. The relevant components then execute their assigned tasks.

With respect to the mobile drive units 20 specifically, the management module 15 may, in particular embodiments, communicate the task assignments 18 to selected mobile drive units 20 that identify one or more destinations for the selected mobile drive units 20. The management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of the inventory system 10, as a whole, or individual components of the inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks, the mobile drive units 20 may dock with and transport the inventory holders 30 within the workspace 70. In some examples, docking with an inventory holder 30 may include coupling components of the mobile drive unit 20 to components of the inventory holder 30. The mobile drive units 20 may dock with the inventory holders 30 by connecting to, lifting, and/or otherwise interacting with the inventory holders 30 in any other suitable manner so that, when docked, the mobile drive units 20 are coupled to and/or support the inventory holders 30 and can move the inventory holders 30 within the workspace 70. While the description below focuses on particular embodiments of the mobile drive unit 20 and the inventory holder 30 that are configured to dock in a particular manner, alternative embodiments of the mobile drive unit 20 and the inventory holder 30 may be configured to dock in any manner suitable to allow the mobile drive unit 20 to move the inventory holder 30 within the workspace 70. Additionally, as noted below, in particular embodiments, the mobile drive units 20 represent all or portions of the inventory holders 30. In such embodiments, the mobile drive units 20 may not dock with the inventory holders 30 before transporting the inventory holders 30 and/or the mobile drive units 20 may each remain continually docked with a particular inventory holder 30.

While the appropriate components of the inventory system 10 complete assigned tasks, the management module 15 may interact with the relevant components to ensure the efficient use of space, equipment, manpower, and other resources available to the inventory system 10. As one specific example of such interaction, the management module 15 is responsible, in particular embodiments, for planning the paths the mobile drive units 20 take when moving within the workspace 70 and for allocating use of a particular portion of the workspace 70 to a particular mobile drive unit 20 for purposes of completing an assigned task. In such embodiments, the mobile drive units 20 may, in response to being assigned a task, request a path to a particular destination associated with the task. Moreover, while the description below focuses on one or more embodiments in which the mobile drive unit 20 requests paths from the management module 15, the mobile drive unit 20 may, in alternative embodiments, generate its own paths.

Components of the inventory system 10 may provide information to the management module 15 regarding their current state, other components of the inventory system 10 with which they are interacting, and/or other conditions relevant to the operation of the inventory system 10. This may allow the management module 15 to utilize feedback from the relevant components to update algorithm parameters, adjust policies, or otherwise modify its decision-making to respond to changes in operating conditions or the occurrence of particular events.

In addition, while the management module 15 may be configured to manage various aspects of the operation of the components of the inventory system 10, in particular embodiments, the components themselves may also be responsible for decision-making relating to certain aspects of their operation, thereby reducing the processing load on the management module 15.

Thus, based on its knowledge of the location, current state, and/or other characteristics of the various components of the inventory system 10 and an awareness of all the tasks currently being completed, the management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of the inventory system 10 may be able to support a number of techniques for efficiently executing various aspects of the operation of the inventory system 10. As a result, particular embodiments of the management module 15 may, by implementing one or more management techniques described below, enhance the efficiency of the inventory system 10 and/or provide other operational benefits.

Figure 6:
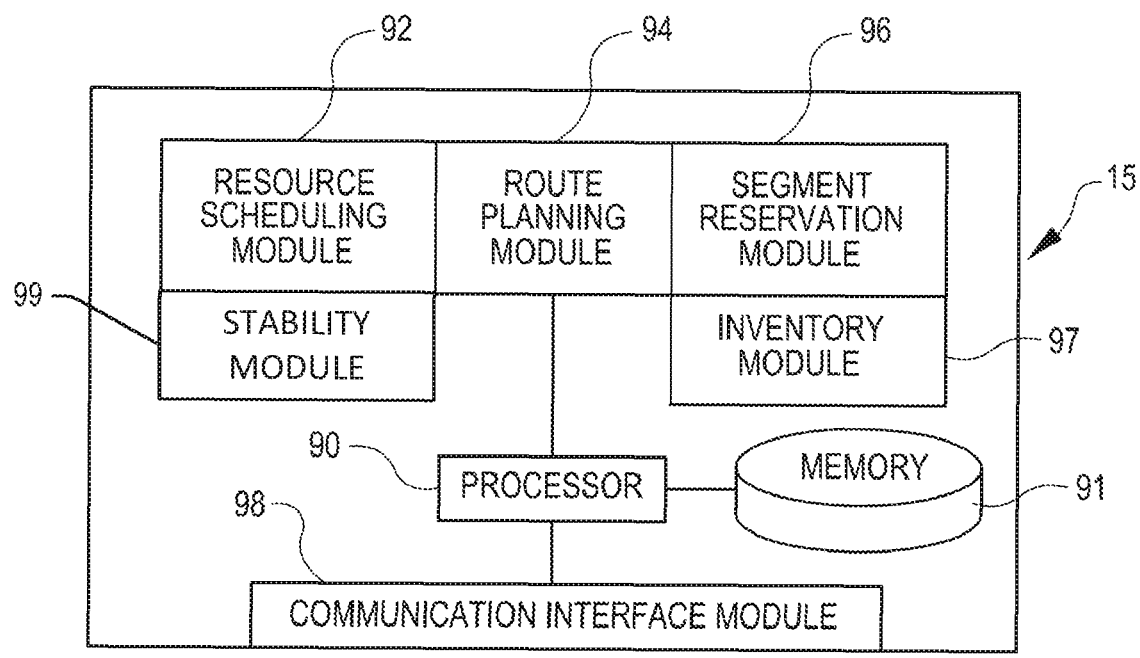
FIG. 6 illustrates in greater detail the components of an example management module that may be utilized in particular embodiments of the inventory system shown in FIG. 5.

FIG. 6 illustrates in greater detail the components of a particular embodiment of the management module 15. As shown, the example embodiment includes a resource scheduling module 92, a route planning module 94, a segment reservation module 96, an inventory module 97, a stability module 99, a communication interface module 98, a processor 90, and a memory 91. The management module 15 may represent a single component, multiple components located at a central location within the inventory system 10, or multiple components distributed throughout inventory system 10. For example, the management module 15 may represent components of one or more mobile drive units 20 that are capable of communicating information between the mobile drive units 20 and coordinating the movement of the mobile drive units 20 within the workspace 70. In general, the management module 15 may include any appropriate combination of hardware and/or software suitable to provide the described functionality.

The processor 90 is operable to execute instructions associated with the functionality provided by the management module 15. The processor 90 may comprise one or more general purpose computers, dedicated microprocessors, or other processing devices capable of communicating electronic information. Examples of the processor 90 include one or more application-specific integrated circuits (ASICs), field programmable gate arrays (FPGAs), digital signal processors (DSPs) and any other suitable specific or general purpose processors.

The memory 91 stores processor instructions, inventory requests, reservation information, state information for the various components of the inventory system 10 and/or any other appropriate values, parameters, or information utilized by the management module 15 during operation. The memory 91 may represent any collection and arrangement of volatile or nonvolatile, local or remote devices suitable for storing data. Examples of the memory 91 include, but are not limited to, random access memory (RAM) devices, read only memory (ROM) devices, magnetic storage devices, optical storage devices or any other suitable data storage devices.

The resource scheduling module 92 processes received inventory requests and generates one or more assigned tasks to be completed by the components of the inventory system 10. The resource scheduling module 92 may also select one or more appropriate components for completing the assigned tasks and, using the communication interface module 98, communicate the assigned tasks to the relevant components.

Additionally, the resource scheduling module 92 may also be responsible for generating assigned tasks associated with various management operations, such as prompting the mobile drive units 20 to recharge batteries or have batteries replaced, instructing the inactive mobile drive units 20 to park in a location outside the anticipated traffic flow or a location near the anticipated site of future tasks, and/or directing the mobile drive units 20 selected for repair or maintenance to move towards a designated maintenance station.

The route planning module 94 receives route requests from the mobile drive units 20. These route requests identify one or more destinations associated with a task the requesting mobile drive unit 20 is executing. In response to receiving a route request, the route planning module 94 generates a path to one or more destinations identified in the route request. The route planning module 94 may implement any appropriate algorithms utilizing any appropriate parameters, factors, and/or considerations to determine the appropriate path. After generating an appropriate path, the route planning module 94 transmits a route response identifying the generated path to the requesting mobile drive unit 20 using the communication interface module 98.

The segment reservation module 96 receives reservation requests from the mobile drive units 20 attempting to move along paths generated by the route planning module 94. These reservation requests request the use of a particular portion of the workspace 70 (referred to herein as a "segment") to allow the requesting mobile drive unit 20 to avoid collisions with other mobile drive units 20 while moving across the reserved segment. In response to received reservation requests, the segment reservation module 96 transmits a reservation response granting or denying the reservation request to the requesting mobile drive unit 20 using the communication interface module 98.

The inventory module 97 maintains information about the location and number of the inventory items 40 in the inventory system 10. Information can be maintained about the number of the inventory items 40 in a particular inventory holder 30, and the maintained information can include the location of those inventory items 40 in the inventory holder 30. The inventory module 97 can also communicate with the mobile drive units 20, utilizing the task assignments 18 to maintain, replenish or move the inventory items 40 within the inventory system 10.

The stability module 99 is configured to manage the operation described herein relating to stability of the inventory movement systems 100, 200, 300, 401. For example, the stability module 99 accesses or otherwise receives information regarding inventory held within a particular inventory holder 30 in order to determine a center of gravity of the inventory holder 30. Similarly, the stability module 99 accesses or otherwise receives sensing information from one or more sensors on the mobile drive unit 20 configured to sense information relating to stability of the inventory movement system 100. For example, the sensing information may include force information, load information, movement information, or any other suitable information that may be collected, sensed, derived, or accessed and that relates to the stability of the inventory movement system 100. The stability module 99 is also configured to instruct components of the mobile drive unit 20 to engage with the inventory holder 30 and adjust a mounting angle of the mobile drive unit 20 and the inventory holder 30. In this manner, the stability module 99 may manage the determination of the mounting angle and the rotation of the inventory holder 30 through the mounting angle.

The communication interface module 98 facilitates communication between the management module 15 and other components of the inventory system 10, including reservation responses, reservation requests, route requests, route responses, and task assignments. These reservation responses, reservation requests, route requests, route responses, and task assignments may represent communication of any form appropriate based on the capabilities of the management module 15 and may include any suitable information. Depending on the configuration of the management module 15, the communication interface module 98 may be responsible for facilitating either or both of wired and wireless communication between the management module 15 and the various components of the inventory system 10. In particular embodiments, the management module 15 may communicate using communication protocols such as 802.11, Bluetooth, or Infrared Data Association (IrDA) standards. Furthermore, the management module 15 may, in particular embodiments, represent a portion of the mobile drive unit 20 or other components of the inventory system 10. In such embodiments, the communication interface module 98 may facilitate communication between the management module 15 and other parts of the same system component.

In general, the resource scheduling module 92, the route planning module 94, the segment reservation module 96, the inventory module 97, the stability module 99, and the communication interface module 98 may each represent any appropriate hardware and/or software suitable to provide the described functionality. In addition, as noted above, the management module 15 may, in particular embodiments, represent multiple different discrete components and any or all of the resource scheduling module 92, the route planning module 94, the segment reservation module 96, the inventory module 97, and the stability module 99, and the communication interface module 98 may represent components physically separate from the remaining elements of the management module 15. Moreover, any two or more of the resource scheduling module 92, the route planning module 94, the segment reservation module 96, the inventory module 97, the stability module 99, and the communication interface module 98 may share common components. For example, in particular embodiments, the resource scheduling module 92, the route planning module 94, the segment reservation module 96, the inventory module 97, and the stability module 99 represent computer processes executing on the processor 90 and the communication interface module 98 comprises a wireless transmitter, a wireless receiver, and a related computer process executing on the processor 90.

Figure 7:
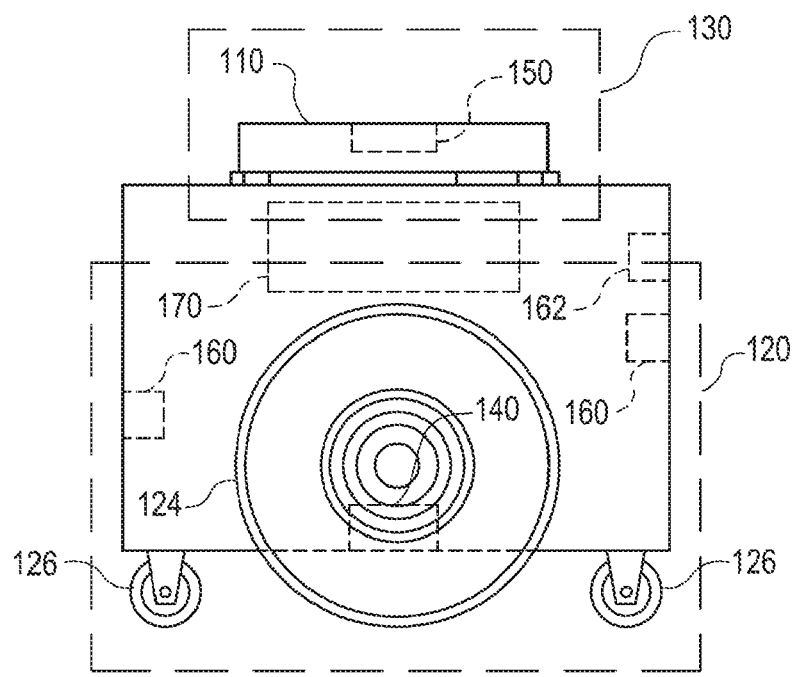
FIGS. 7 and 8 illustrate in greater detail an example mobile drive unit that may be utilized in particular embodiments of the inventory system shown in FIG. 5.
Figure 8:
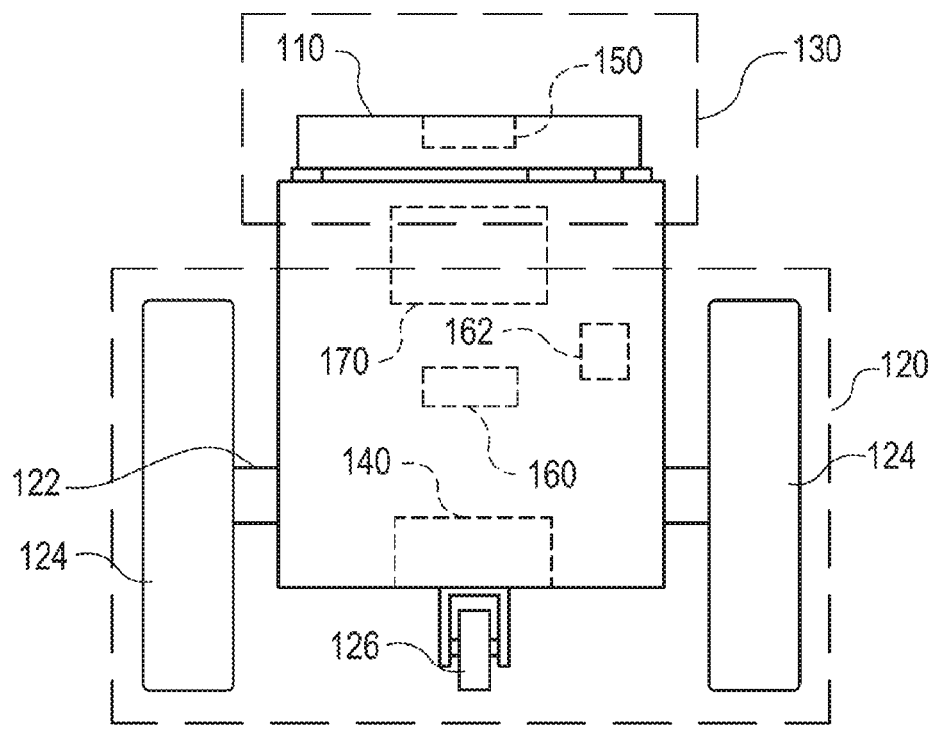

FIGS. 7 and 8 illustrate in greater detail the components of a particular embodiment of the mobile drive unit 20. In particular, FIGS. 7 and 8 include a side and front view of an example mobile drive unit 20. The mobile drive unit 20 includes a platform 110, a drive module 120, a docking head assembly 130, and a control module 170. The platform 110 may be considered a docking head. The docking head assembly 130 may be an actuator configured to move the platform 110 to engage with the inventory holder 30. Additionally, the mobile drive unit 20 may include one or more sensors configured to detect or determine the location of the mobile drive unit 20, the inventory holder 30, and/or other appropriate elements of the inventory system 10. In the illustrated embodiment, the mobile drive unit 20 includes a position sensor 140, a holder sensor 150, an obstacle sensor 160, and an identification signal transmitter 162.

The platform 110, in particular embodiments of the mobile drive unit 20, couples the mobile drive unit 20 to the inventory holder 30 and/or supports the inventory holder 30 when the mobile drive unit 20 is docked to the inventory holder 30. The platform 110 may additionally allow the mobile drive unit 20 to maneuver the inventory holder 30, such as by lifting the inventory holder 30, propelling the inventory holder 30, rotating the inventory holder 30, tilting the inventory holder 30, and/or moving the inventory holder 30 in any other appropriate manner. The platform 110 may also include any appropriate combination of components, such as ribs, spikes, and/or corrugations, to facilitate such manipulation of the inventory holder 30. For example, in particular embodiments, the platform 110 may include a high-friction portion that abuts a portion of the inventory holder 30 while the mobile drive unit 20 is docked to the inventory holder 30. In such embodiments, frictional forces created between the high-friction portion of the platform 110 and a surface of the inventory holder 30 may induce translational and rotational movement in the inventory holder 30 when the platform 110 moves and rotates, respectively. As a result, the mobile drive unit 20 may be able to manipulate the inventory holder 30 by moving or rotating the platform 110, either independently or as a part of the movement of the mobile drive unit 20 as a whole.

The drive module 120 propels the mobile drive unit 20 and, when the mobile drive unit 20 and the inventory holder 30 are docked, the inventory holder 30. The drive module 120 may represent any appropriate collection of components operable to propel the mobile drive unit 20. For example, in the illustrated embodiment, the drive module 120 includes a motorized axle 122, a pair of motorized wheels 124, and a pair of stabilizing wheels 126. One motorized wheel 124 is located at each end of the motorized axle 122, and one stabilizing wheel 126 is positioned at each end of the mobile drive unit 20.

The docking head assembly 130 moves the platform 110 towards the inventory holder 30 to facilitate docking of the mobile drive unit 20 and the inventory holder 30. The docking head assembly 130 may also be capable of adjusting the position or orientation of the platform 110 in other suitable manners to facilitate docking. The docking head assembly 130 may include any appropriate components, based on the configuration of the mobile drive unit 20 and the inventory holder 30, for moving the platform 110 or otherwise adjusting the position or orientation of the platform 110. For example, in the illustrated embodiment, the docking head assembly 130 includes a motorized shaft (not shown) attached to the center of the platform 110. The motorized shaft is operable to lift the platform 110 as appropriate for docking with the inventory holder 30.

The drive module 120 may be configured to propel the mobile drive unit 20 in any appropriate manner. For example, in the illustrated embodiment, the motorized wheels 124 are operable to rotate in a first direction to propel the mobile drive unit 20 in a forward direction. The motorized wheels 124 are also operable to rotate in a second direction to propel the mobile drive unit 20 in a backward direction. In the illustrated embodiment, the drive module 120 is also configured to rotate the mobile drive unit 20 by rotating the motorized wheels 124 in different directions from one another or by rotating the motorized wheels 124 at different speeds from one another.

The position sensor 140 represents one or more sensors, detectors, or other components suitable for determining the location of the mobile drive unit 20 in any appropriate manner. For example, in particular embodiments, the workspace 70 associated with the inventory system 10 includes a number of fiducial marks that mark points on a two-dimensional grid that covers all or a portion of the workspace 70. In such embodiments, the position sensor 140 may include a camera and suitable image- and/or video-processing components, such as an appropriately-programmed digital signal processor, to allow the position sensor 140 to detect fiducial marks within the camera's field of view. The control module 170 may store location information that the position sensor 140 updates as the position sensor 140 detects fiducial marks. As a result, the position sensor 140 may utilize fiducial marks to maintain an accurate indication of the location of the mobile drive unit 20 and to aid in navigation when moving within the workspace 70.

The holder sensor 150 represents one or more sensors, detectors, or other components suitable for detecting the inventory holder 30 and/or determining, in any appropriate manner, the location of the inventory holder 30, as an absolute location or as a position relative to the mobile drive unit 20. The holder sensor 150 may be capable of detecting the location of a particular portion of the inventory holder 30 or the inventory holder 30 as a whole. The mobile drive unit 20 may then use the detected information for docking with or otherwise interacting with the inventory holder 30.

The obstacle sensor 160 represents one or more sensors capable of detecting objects located in one or more different directions in which the mobile drive unit 20 is capable of moving. The obstacle sensor 160 may utilize any appropriate components and techniques, including optical, radar, sonar, pressure-sensing and/or other types of detection devices appropriate to detect objects located in the direction of travel of the mobile drive unit 20. In particular embodiments, the obstacle sensor 160 may transmit information describing objects it detects to the control module 170 to be used by the control module 170 to identify obstacles and to take appropriate remedial actions to prevent the mobile drive unit 20 from colliding with obstacles and/or other objects.

The obstacle sensor 160 may also detect signals transmitted by other mobile drive units 20 operating in the vicinity of the illustrated mobile drive unit 20. For example, in particular embodiments of the inventory system 10, one or more mobile drive units 20 may include an identification signal transmitter 162 that transmits a drive identification signal. The drive identification signal indicates to the other mobile drive units 20 that the object transmitting the drive identification signal is in fact a mobile drive unit. The identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, the obstacle sensor 160 may also be capable of detecting state information transmitted by the other mobile drive units 20. For example, in particular embodiments, the identification signal transmitter 162 may be capable of including state information relating to the mobile drive unit 20 in the transmitted identification signal. This state information may include, but is not limited to, the position, velocity, direction, and the braking capabilities of the transmitting mobile drive unit 20. In particular embodiments, the mobile drive unit 20 may use the state information transmitted by other mobile drive units to avoid collisions when operating in close proximity with those other mobile drive units.

The control module 170 monitors and/or controls operation of the drive module 120 and the docking head assembly 130. The control module 170 may also receive information from sensors such as the position sensor 140 and the holder sensor 150 and adjust the operation of the drive module 120, the docking head assembly 130, and/or other components of the mobile drive unit 20 based on this information. Additionally, in particular embodiments, the mobile drive unit 20 may be configured to communicate with a management device of the inventory system 10 and the control module 170 may receive commands transmitted to the mobile drive unit 20 and communicate information back to the management device utilizing appropriate communication components of the mobile drive unit 20. The control module 170 may include any appropriate hardware and/or software suitable to provide the described functionality. In particular embodiments, the control module 170 includes a general-purpose microprocessor programmed to provide the described functionality. Additionally, the control module 170 may include all or portions of the docking head assembly 130, the drive module 120, the position sensor 140, and/or the holder sensor 150, and/or share components with any of these elements of the mobile drive unit 20.

Moreover, in particular embodiments, the control module 170 may include hardware and software located in components that are physically distinct from the device that houses the drive module 120, the docking head assembly 130, and/or the other components of the mobile drive unit 20 described above. For example, in particular embodiments, each mobile drive unit 20 operating in the inventory system 10 may be associated with a software process (referred to here as a "drive agent") operating on a server that is in communication with the device that houses the drive module 120, the docking head assembly 130, and other appropriate components of the mobile drive unit 20. This drive agent may be responsible for requesting and receiving tasks, requesting and receiving routes, transmitting state information associated with the mobile drive unit 20, and/or otherwise interacting with the management module 15 and other components of the inventory system 10 on behalf of the device that physically houses the drive module 120, the docking head assembly 130, and the other appropriate components of the mobile drive unit 20. As a result, for the purposes of this description and the claims that follow, the term "mobile drive unit" includes software and/or hardware, such as agent processes, that provides the described functionality on behalf of the mobile drive unit 20 but that may be located in physically distinct devices from the drive module 120, the docking head assembly 130, and/or the other components of the mobile drive unit 20 described above.

While FIGS. 7 and 8 illustrate a particular embodiment of the mobile drive unit 20 containing certain components and configured to operate in a particular manner, the mobile drive unit 20 may represent any appropriate component and/or collection of components configured to transport and/or facilitate the transport of the inventory holders 30. As another example, the mobile drive unit 20 may represent part of an overhead crane system in which one or more crane assemblies are capable of moving within a network of wires or rails to a position suitable to dock with a particular inventory holder 30. After docking with the inventory holder 30, the crane assembly may then lift the inventory holder 30 and move inventory to another location for purposes of completing an assigned task.

Furthermore, in particular embodiments, the mobile drive unit 20 may represent all or a portion of the inventory holder 30. The inventory holder 30 may include motorized wheels or any other components suitable to allow the inventory holder 30 to propel itself. As one specific example, a portion of the inventory holder 30 may be responsive to magnetic fields. The inventory system 10 may be able to generate one or more controlled magnetic fields capable of propelling, maneuvering and/or otherwise controlling the position of the inventory holder 30 as a result of the responsive portion of the inventory holder 30. In such embodiments, the mobile drive unit 20 may represent the responsive portion of the inventory holder 30 and/or the components of the inventory system 10 responsible for generating and controlling these magnetic fields. While this description provides several specific examples, the mobile drive unit 20 may, in general, represent any appropriate component and/or collection of components configured to transport and/or facilitate the transport of the inventory holders 30.

Figure 9:
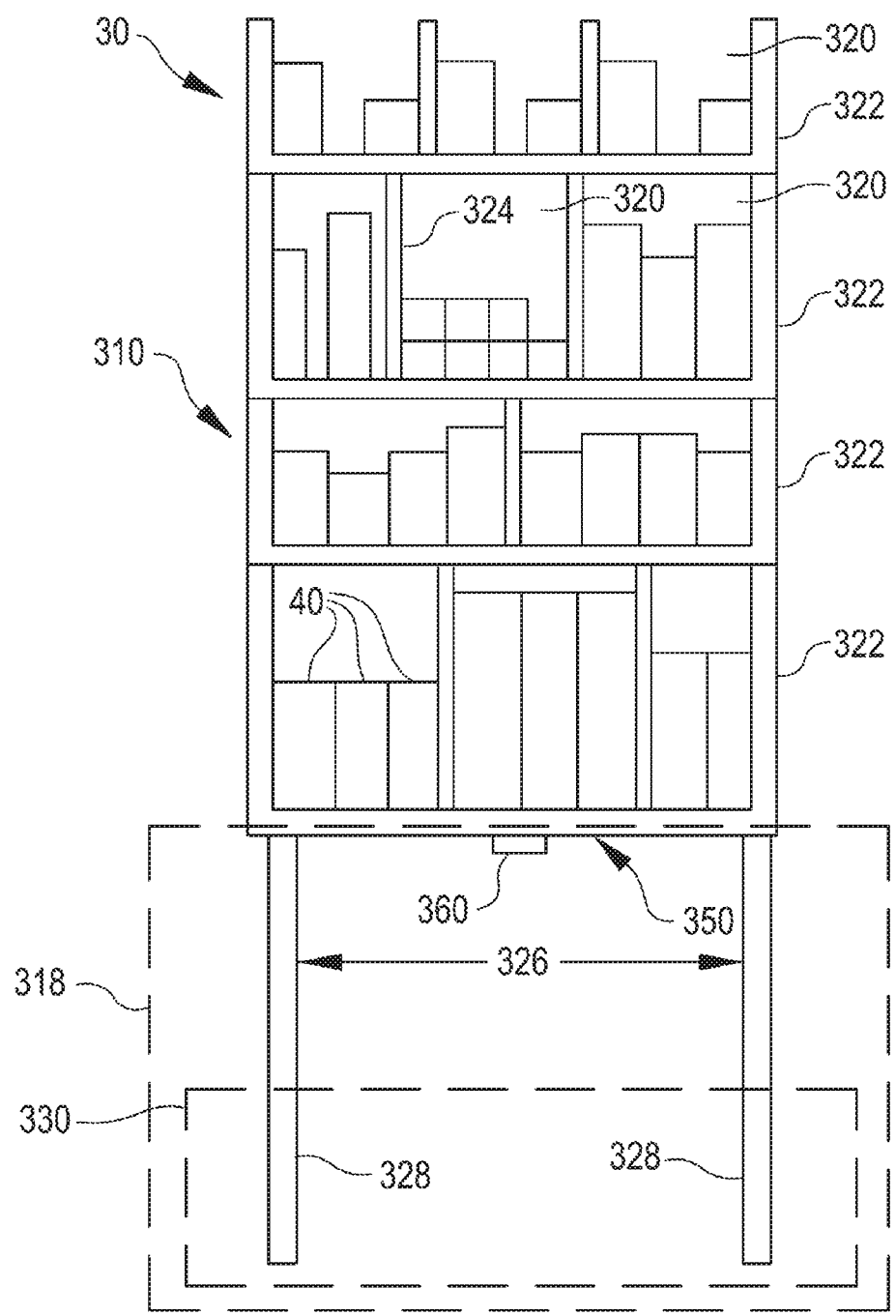
FIG. 9 illustrates in greater detail an example inventory holder that may be utilized in particular embodiments of the inventory system shown in FIG. 5.

FIG. 9 illustrates in greater detail the components of a particular embodiment of the inventory holder 30. In particular, FIG. 9 illustrates the structure and contents of one side of an example inventory holder 30. In a particular embodiment, the inventory holder 30 may comprise any number of faces with similar or different structure. As illustrated, the inventory holder 30 includes a frame 310, a plurality of legs 328, and a docking surface 350.

The frame 310 holds the inventory items 40. The frame 310 provides storage space for storing the inventory items 40 external or internal to the frame 310. The storage space provided by the frame 310 may be divided into a plurality of inventory bins 320, each capable of holding the inventory items 40. The inventory bins 320 may include any appropriate storage elements, such as bins, compartments, or hooks.

In a particular embodiment, the frame 310 is composed of a plurality of trays 322 stacked upon one another and attached to or stacked on a base 318. In such an embodiment, the inventory bins 320 may be formed by a plurality of adjustable dividers 324 that may be moved to resize one or more inventory bins 320. In alternative embodiments, the frame 310 may represent a single inventory bin 320 that includes a single tray 322 and no adjustable dividers 324. Additionally, in particular embodiments, the frame 310 may represent a load-bearing surface mounted on mobility element 330. The inventory items 40 may be stored on such an inventory holder 30 by being placed on the frame 310. In general, the frame 310 may include internal and/or external storage space divided into any appropriate number of the inventory bins 320 in any appropriate manner.

Additionally, in a particular embodiment, the frame 310 may include a plurality of device openings 326 that allow the mobile drive unit 20 to position the platform 110 adjacent the docking surface 350. The size, shape, and placement of the device openings 326 may be determined based on the size, the shape, and other characteristics of the particular embodiment of the mobile drive unit 20 and/or the inventory holder 30 utilized by the inventory system 10. For example, in the illustrated embodiment, the frame 310 includes four legs 328 that form the device openings 326 and allow the mobile drive unit 20 to position the mobile drive unit 20 under the frame 310 and adjacent to the docking surface 350. The length of the legs 328 may be determined based on a height of the mobile drive unit 20.

The docking surface 350 comprises a portion of the inventory holder 30 that couples to, abuts, and/or rests upon a portion of the platform 110, when the mobile drive unit 20 is docked to the inventory holder 30. Additionally, the docking surface 350 supports a portion or all of the weight of the inventory holder 30 while the inventory holder 30 is docked with the mobile drive unit 20. The composition, shape, and/or texture of the docking surface 350 may be designed to facilitate maneuvering of the inventory holder 30 by the mobile drive unit 20. For example, as noted above, in particular embodiments, the docking surface 350 may comprise a high-friction portion. When the mobile drive unit 20 and the inventory holder 30 are docked, frictional forces induced between the platform 110 and this high-friction portion may allow the mobile drive unit 20 to maneuver the inventory holder 30. In some examples, dynamically adjusting a mounting angle of the platform 110 as described herein may provide increased traction between the docking surface 350 and the platform 110 because the mounting angle may be optimized for stability of the inventory holder 30. Additionally, in particular embodiments, the docking surface 350 may include appropriate components suitable to receive a portion of the platform 110, couple the inventory holder 30 to the mobile drive unit 20, and/or facilitate control of the inventory holder 30 by the mobile drive unit 20.

Holder identifier 360 marks a predetermined portion of the inventory holder 30 and the mobile drive unit 20 may use the holder identifier 360 to align with the inventory holder 30 during docking and/or to determine the location of the inventory holder 30. More specifically, in particular embodiments, the mobile drive unit 20 may be equipped with components, such as the holder sensor 150, that can detect the holder identifier 360 and determine its location relative to the mobile drive unit 20. As a result, the mobile drive unit 20 may be able to determine the location of the inventory holder 30 as a whole. For example, in particular embodiments, the holder identifier 360 may represent a reflective marker that is positioned at a predetermined location on the inventory holder 30 and that the holder sensor 150 can optically detect using an appropriately-configured camera.

Depending on the configuration and characteristics of the mobile drive unit 20 and the inventory system 10, the mobile drive unit 20 may move the inventory holder 30 using a variety of appropriate methods. In a particular embodiment, the mobile drive unit 20 is capable of moving the inventory holder 30 along a two-dimensional grid, combining movement along straight-line segments with ninety-degree rotations and arcing paths to transport the inventory holder 30 from the first location to the second location. Additionally, while moving, the mobile drive unit 20 may use fixed objects located in the workspace as reference points to assist in navigation. For example, in particular embodiments, the inventory system 10 includes multiple fiducial marks. The mobile drive unit 20 may be configured to detect the fiducial marks and to determine the location of the mobile drive unit 20 and/or measure its movement based on the detection of the fiducial marks.

After the mobile drive unit 20 arrives at the second location, the mobile drive unit 20 may perform appropriate operations to facilitate access to inventory items 40 stored in the inventory holder 30. For example, the mobile drive unit 20 may rotate the inventory holder 30 to present a particular face of the inventory holder 30 to an operator of the inventory system 10 or other suitable party, such as a packer selecting the inventory items 40 from the inventory holder 30. The mobile drive unit 20 may also undock from the inventory holder 30. Alternatively, instead of undocking at the second location, the mobile drive unit 20 may transport the inventory holder 30 back to the first location or to a third location after any appropriate actions have been taken involving the inventory items 40. For example, after a packer has removed particular inventory items 40 from the inventory holder 30, the mobile drive unit 20 may return the inventory holder 30 to its original storage location, a new storage location, or another inventory station. The mobile drive unit 20 may then undock from inventory holder 30 at this new location.

Figure 10:
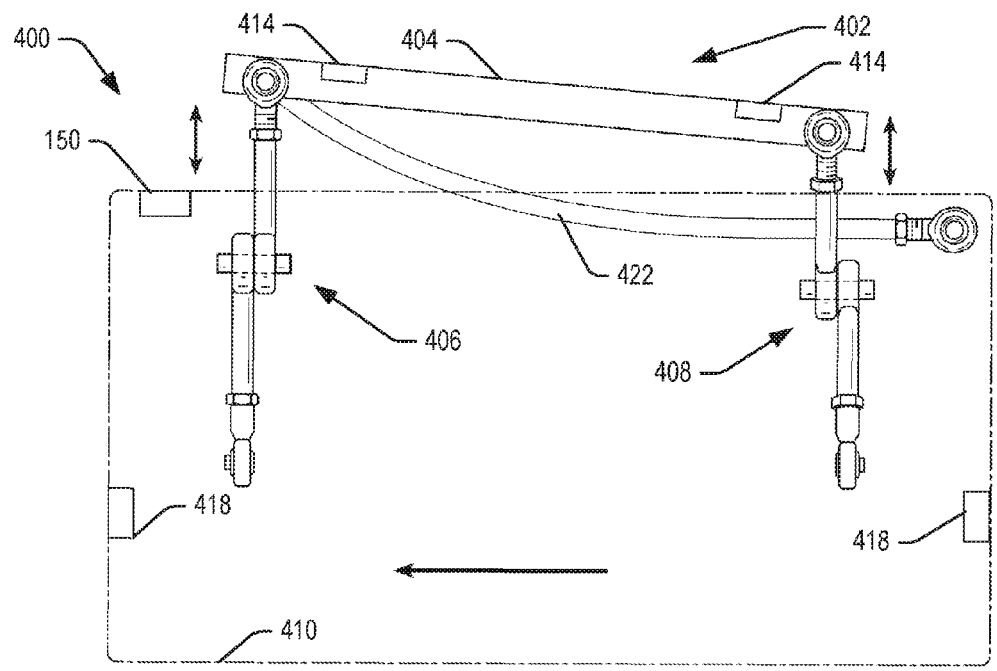
FIG. 10 illustrates a side-view of an example docking head assembly that may be utilized in particular embodiments of the example mobile drive unit shown in FIGS. 7 and 8.
Figure 11:
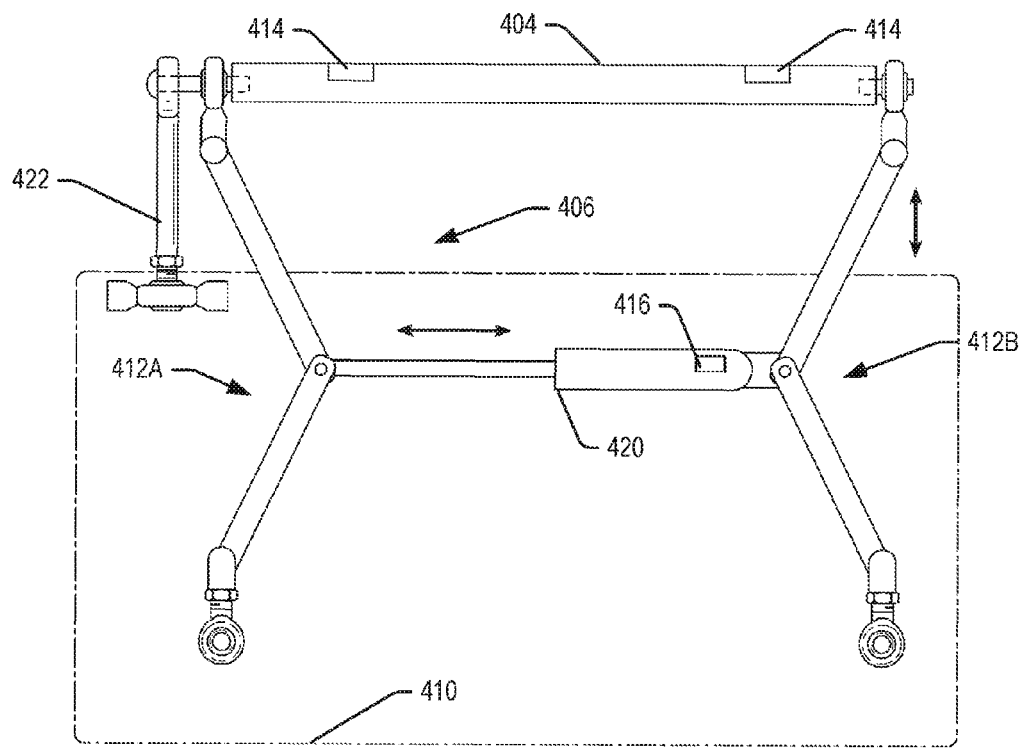
FIG. 11 illustrates a front-view of an example docking head assembly that may be utilized in particular embodiments of the example mobile drive unit shown in FIGS. 7 and 8.

As introduced above, embodiments herein are directed to an inventory system having multiple inventory holders and drive units for moving the inventory holders. Specifically, features herein are directed to the inventory movement system including a mobile drive unit configured to move an inventory holder and to account for various forces acting on the inventory holder in order to increase stability of the inventory holder. To this end, FIGS. 10 and 11 illustrate various views of a mobile drive unit 400 according to at least one example. In FIG. 10, a side view of the mobile drive unit 400 is illustrated. For illustrative purposes, the mobile drive unit 400 is oriented with a forward portion on the left and a rear portion on the right. In FIG. 11, a front view of the mobile drive unit 400 is illustrated. The mobile drive unit 400 is illustrated in a simplified form and is an example of the mobile drive unit 20 described herein. The mobile drive unit 400 may include a body 410, which may be a chassis, a frame, structure, base, or other comparable rigid or semi-rigid structure.

Components of the mobile drive unit may be attached to the body 410. For example, a docking head assembly 402 may be rotationally attached to a rigid portion within the body 410 of the mobile drive unit 400. The docking head assembly 402 is an example of the docking head assembly 130 described herein. Components of the docking head assembly 402 and the mobile drive unit 400 may be in communication with the management module 15 and operate under control of the management module 15. The docking head assembly 402 may include a platform 404, a front actuator assembly 406, and a rear actuator assembly 408. The platform 404 is an example of the platform 110 described herein. The docking head assembly 402 may be configured to raise and lower the platform 404 into, and out of, engagement with the inventory holder 30. The docking head assembly 402 may also be configured to raise and lower portions of the platform 404 in order to create an angle that is greater than zero between the platform 404 and the body 410. Thus, in this example, the front actuator assembly 406 and the rear actuator assembly 408 may be operated independently of each other, but in some examples, may be operated in unison. As illustrated in FIG. 10, a rear portion of the platform 404 which is rotationally attached to the rear actuator assembly 408 is lower than a front portion of the platform 404 which is rotationally attached to the front actuator assembly 406. In some examples, the rotational attachments points of the docking head assembly 402 may include Heim joints, other comparable mounting structures described herein, and any other comparable mounting structure.

In some examples, the front actuator assembly 406 and the rear actuator assembly 408 may be scissor style lifters. For example, as illustrated in FIG. 11, the front actuator assembly 406 may include a linear actuator 420 rotationally attached on two ends to two opposing arms 412A, 412B. As the linear actuator 420, which may be an electric, hydraulic, or other comparable device, extends and contracts, each of the opposing arms 412A, 412B will collapse down and extend up. As the opposing arms 412A, 412B collapse down, the front portion of the platform 404 is lowered. As the opposing arms 412A, 412B extend up, the front portion of the platform 404 is raised. The rear actuator assembly 408 may be configured similarly as the front actuator assembly 406. In some examples, a track bar 422 may be provided that is rotationally attached to the platform 404 and the body 410.

In some examples, the track bar 422 is an example of a Panhard bar and may provide lateral support to the docking head assembly 402. In particular, the track bar 422 may provide lateral support to the platform 404 when docked to the inventory holder 30. In some examples, the front actuator assembly 406 and the rear actuator assembly 408 may be canted relative to each other. For example, attachment locations at the platform 404 of the front actuator assembly 406 and the rear actuator assembly 408 may be closer together than attachment locations at the body 410 of the front actuator assembly 406 and the rear actuator assembly 408. In other words, the top portions of the front actuator assembly 406 and the rear actuator assembly 408 may be rotated towards each other. This may provide increased lateral support of the docking head assembly 402, which may allow for elimination of the track bar 422. Such canting may provide increased forward and backward stability.

The docking head assembly 402 may also include one more load sensors 414 disposed on the platform 404. In some examples, the one or more load sensors 414 are disposed within the platform 404, on top of the platform 404, or otherwise disposed in order to sense load. The one or more load sensors 414 may be configured to sense load exerted by the inventory holder 30 when the inventory holder 30 is coupled to the mobile drive unit 400 via the platform 404. In some examples, the load may be measured in terms of mass, weight, or pressure. The one or more load sensors 414 may be in communication with the management module 15. Sensing information sensed by the one or more load sensors 414 may be used by the management module 15 to determine a location of a center of gravity of the inventory holder 30. For example, the management module 15 may access the sensing information received from each of the one or more load sensors 414 and, based on the relative loads sensed by the one or more load sensors 414, the management module 15 may determine a location of the center of gravity of the inventory holder 30.

In some examples, the docking head assembly 402 may also include one or more sensors 416 configured to measure or detect forces or loads exerted on the front actuator assembly 406 and the rear actuator assembly 408 when the inventory holder 30 is coupled to the mobile drive unit 400 via the platform 404. The one or more sensors 416 may be in communication with the management module 15. Sensing information sensed by the one or more sensors 416 may be used by the management module 15 to determine a location of a center of gravity of the inventory holder 30 or mass, weight, or load corresponding to the inventory holder 30. For example, the management module 15 may access the sensing information received from each of the one or more sensors 416 and, based on the relative forces sensed by the one or more sensors 416, the management module 15 may determine a location of the center of gravity of the inventory holder 30. In some examples, the one or more sensors 416 may be configured to measure position of components of the docking head assembly 402. For example, a particular sensor 416 may detect that a particular linear actuator (e.g., 420) has traveled a certain distance. From this detection and the geometry of the components of the docking head assembly 402, an adjusted angle for the platform 404 relative to the body 410 may be determined, along with other determinations, e.g., a position of the inventory holder 30 relative to the mobile drive unit 400, a location of the center of gravity of the inventory holder 30, or any other suitable determination.

In some examples, the mobile drive unit 400 may also include one or more movement sensors 418 configured to measure or detect movements of the mobile drive unit 400. For example, the one or more movement sensors 418 may be configured to measure angular velocity with respect to X, Y, and Z axes, inclination (e.g., pitch, roll, and yaw) values with respect to X, Y, and Z axes, and acceleration and deceleration with respect to the X, Y, and Z axes. Thus, in some examples, the one or more movement sensors 418 may include variations of accelerometers, gyroscopes, inclination sensors, and any other suitable sensor for measuring movements of the mobile drive unit 400. In some examples, the one or more movement sensors 418 may be optical sensors configured to detect angular variations of a surface on which the mobile drive unit 400 operates or displacement sensors configured to measure displacement of components of the mobile drive unit 400 relative to the surface or in an absolute manner.

In some examples, the one or more movements sensors 418 may sense information that is intrinsic to the mobile drive unit 400. Movement information may be detected from components of the mobile drive unit 400 (e.g., wheel motors, linkages, motors, and other components) via one or more encoders associated with the components. For example, when the mobile drive unit 400 moves the inventory holder 30 along a surface, characteristics of how the wheels of the mobile drive unit 400 are moving (e.g., power being applied, internal forces exerted on axles or surfaces, etc.) may be detected and used to determine the mass of the inventory holder 30 and the location of the center of gravity of the inventory holder 30. Thus, the one or more encoders may be used to detect information that may be used to determine or infer characteristics of the inventory holder 30. The one or more movement sensors 418 may be in communication with the management module 15. Sensing information sensed by the one or more movement sensors 418 may be used by the management module 15 to adjust a mounting angle of the inventory holder 30 relative to the mobile drive unit 400 in order account for movement of the mobile drive unit 400. The mobile drive unit 400 may also include one or more holder sensors 150 configured as described herein. For example, the one or more holder sensors 150 may detect a position of the inventory holder 30 relative to the mobile drive unit 400, detect a shift of the inventory holder 30 relative to the mobile drive unit 400, or any other change in the relationship between the inventory holder 30 and the mobile drive unit 400.

Figure 12:
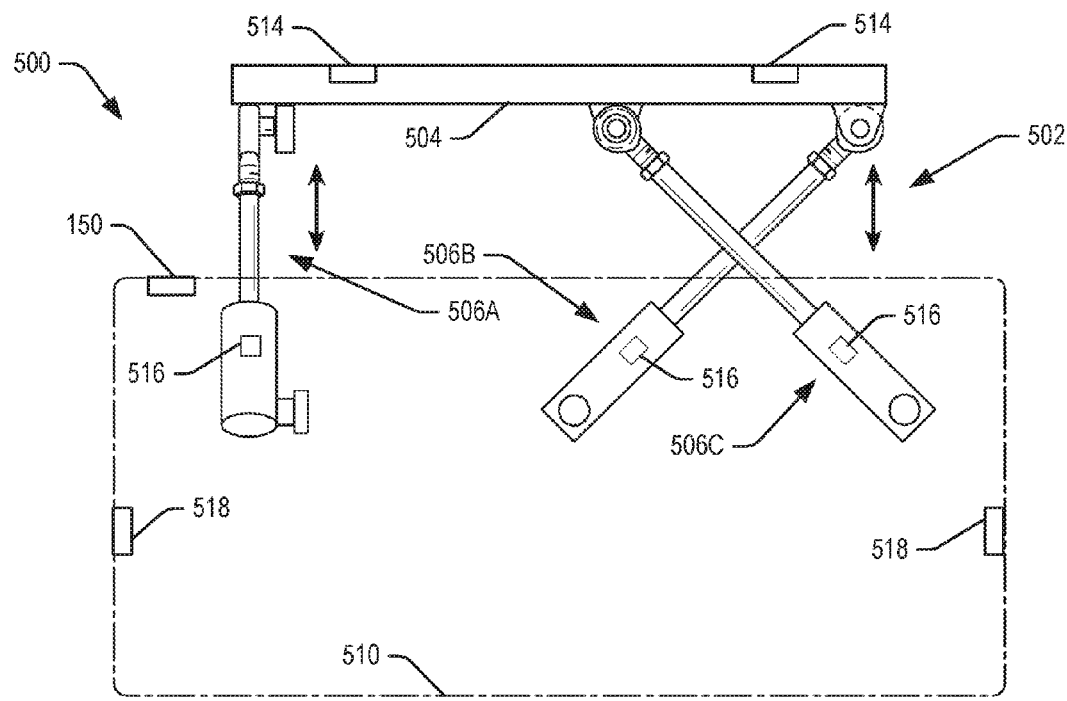
FIG. 12 illustrates a side-view of an example docking head assembly that may be utilized in particular embodiments of the example mobile drive unit shown in FIGS. 7 and 8.
Figure 13:
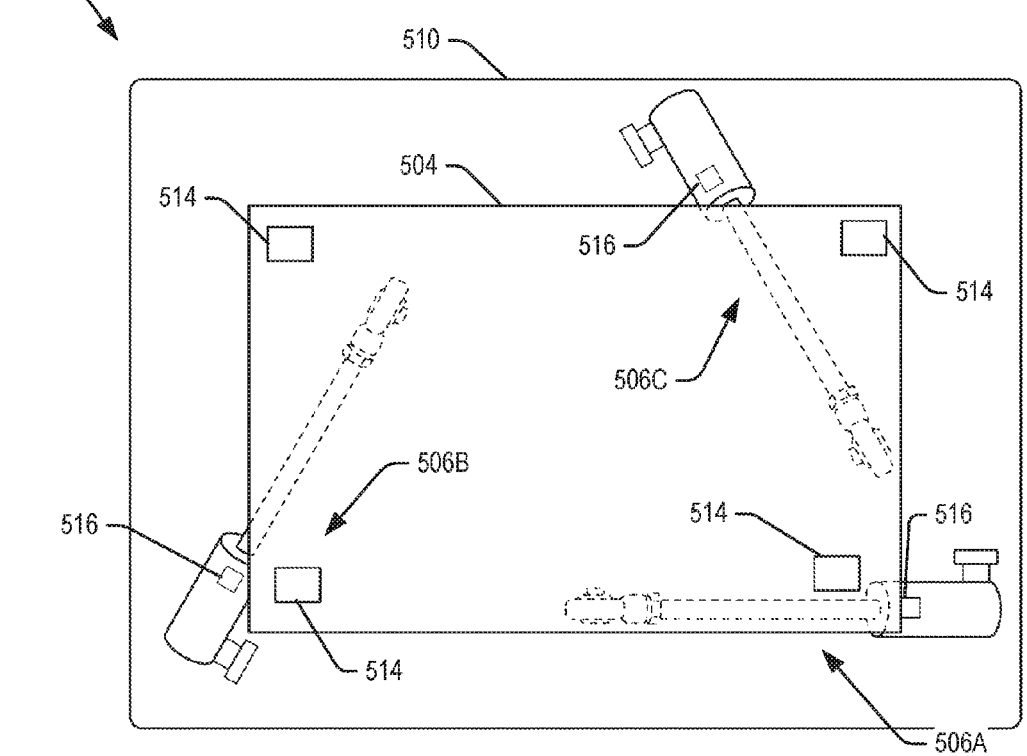
FIG. 13 illustrates a top-view of an example docking head assembly that may be utilized in particular embodiments of the example mobile drive unit shown in FIGS. 7 and 8.

FIGS. 12 and 13 illustrate various views of a mobile drive unit 500 according to at least one example. In FIG. 12, a side view of the mobile drive unit 500 is illustrated. In FIG. 13, a top view of the mobile drive unit 500 is illustrated. The mobile drive unit 500 is illustrated in a simplified form and is an example of the mobile drive unit 20 described herein. The mobile drive unit 500 may include a body 510, which may be a chassis, a frame, structure, base, or other comparable rigid or semi-rigid structure to which components of the mobile drive unit 500 may be attached. For example, a docking head assembly 502 of the mobile drive unit 500 may be rotationally attached to the body 510. The docking head assembly 502 is an example of the docking head assembly 130 described herein. In some examples, the docking head assembly 502 may include a platform 504 and one or more actuator assemblies 506. The platform 504 is an example of the platform 110 described herein.

Components of the docking head assembly 502 and the mobile drive unit 500 may be in communication with the management module 15 and operate under control of the management module 15. The docking head assembly 502 may be configured to raise and lower the platform 504 into, and out of, engagement with the inventory holder 30. The docking head assembly 502 may also be configured to raise and lower different portions of the platform 504 relative to other portions of the platform 504. For example, a front portion may be lowered, while a back portion is raised in order to tilt the platform 504 in a forward direction. In some examples, the docking head assembly 502 may be configured to raise and lower portions of the platform 504 in order to create compound tilting angles. For example, the front portion of the platform 504 may be lowered, the back portion of the platform 504 may be raised, a right portion of the platform 504 may be lowered, and a left portion of the platform 504 may be raised in order to tilt the platform 504 in a forward-right direction.

In the illustrated example, the platform 504 is attached to the body 510 via three actuator assemblies 506A, 506B, and 506C. In some examples, the three actuator assemblies 506A, 506B, and 506C may be separated by about 120 degrees from each as they are disposed around the platform 504. In some examples, greater or fewer actuator assemblies 506 may be used. For example, a single actuator 506 may be used to provide one degree of freedom. In some examples, the use of more actuator assemblies 506 may enable the docking head assembly 502 to have more degrees of freedom. For example, in the illustrated example, the three actuator assemblies 506A, 506B, and 506C may enable the docking head assembly 502 to have at least three degrees of freedom (i.e., raise and lower, tilt forward and aft, and tilt right and left). In some examples, the use of six actuator assemblies 506 may enable the docking head assembly 502 to have six degrees of freedom. In some examples, the mobile drive unit 500 may include more actuator assemblies 506 than degrees of freedom. Such a configuration may enable use of the other actuator assemblies 506 that exceed the degrees of freedom to not only adjust the location of the center gravity, but to also increase stiffness of the payload. The actuator assemblies 506 may be selected from any suitable linear actuator such as, for example, electrical actuators, hydraulic actuators, pneumatic actuators, or any comparable actuating device. The lower portions of the actuator assemblies 506 may be rotationally attached to the body 510 of the mobile drive unit 500. The upper portions of the actuator assemblies 506 may be rotationally attached to the platform 504. Any of the rotational attachments described herein may include any suitable combination of pins, rods, bolts, ball joints, bearings, Heim joints, universal joints, or any other comparable rotational attachment. In some examples, each of the actuator assemblies 506A, 506B, and 506C may operate in unison or independently in order to raise and lower portions of the platform 504.

The docking head assembly 502 may also include one more load sensors 514. The one or more load sensors 514 are examples of the load sensors 414 and may be arranged and configured similarly. In some examples, the docking head assembly 502 may also include one or more sensors 516. The one or more sensors 516 are examples of the sensors 416 and may be arranged and configured similarly. In some examples, the mobile drive unit 500 may also include one or more movement sensors 518. The one or more movement sensors 518 are examples of the movement sensors 418 and may be arranged and configured similarly. The mobile drive unit 500 may also include one or more holder sensors 150 configured as described herein.

Figure 14:
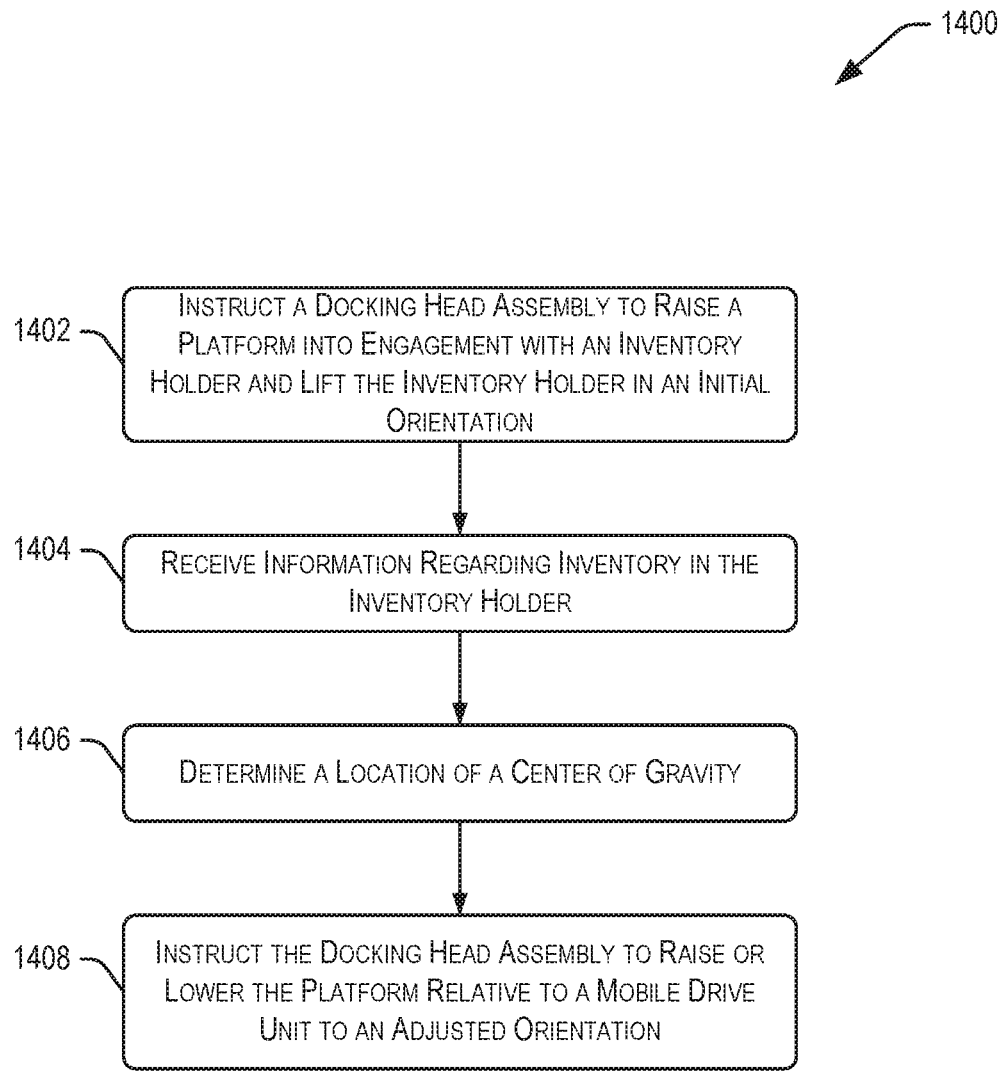
FIG. 14 illustrates a flow diagram depicting example acts for implementing techniques relating to tilting inventory holders for stability control as described herein, according to at least one embodiment.
Figure 15:
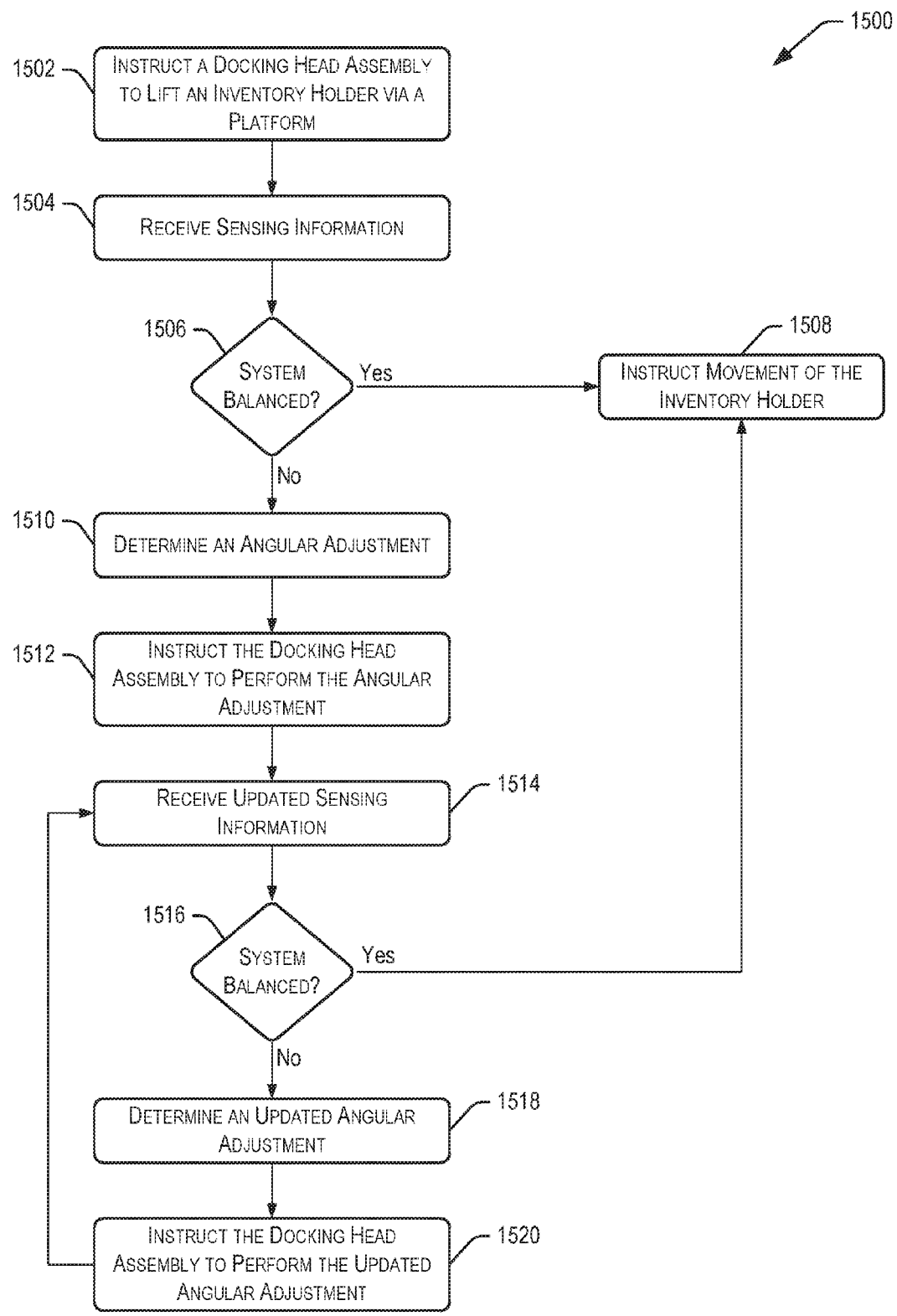
FIG. 15 illustrates a flow diagram depicting example acts for implementing techniques relating to tilting inventory holders for stability control as described herein, according to at least one embodiment.
Figure 16:
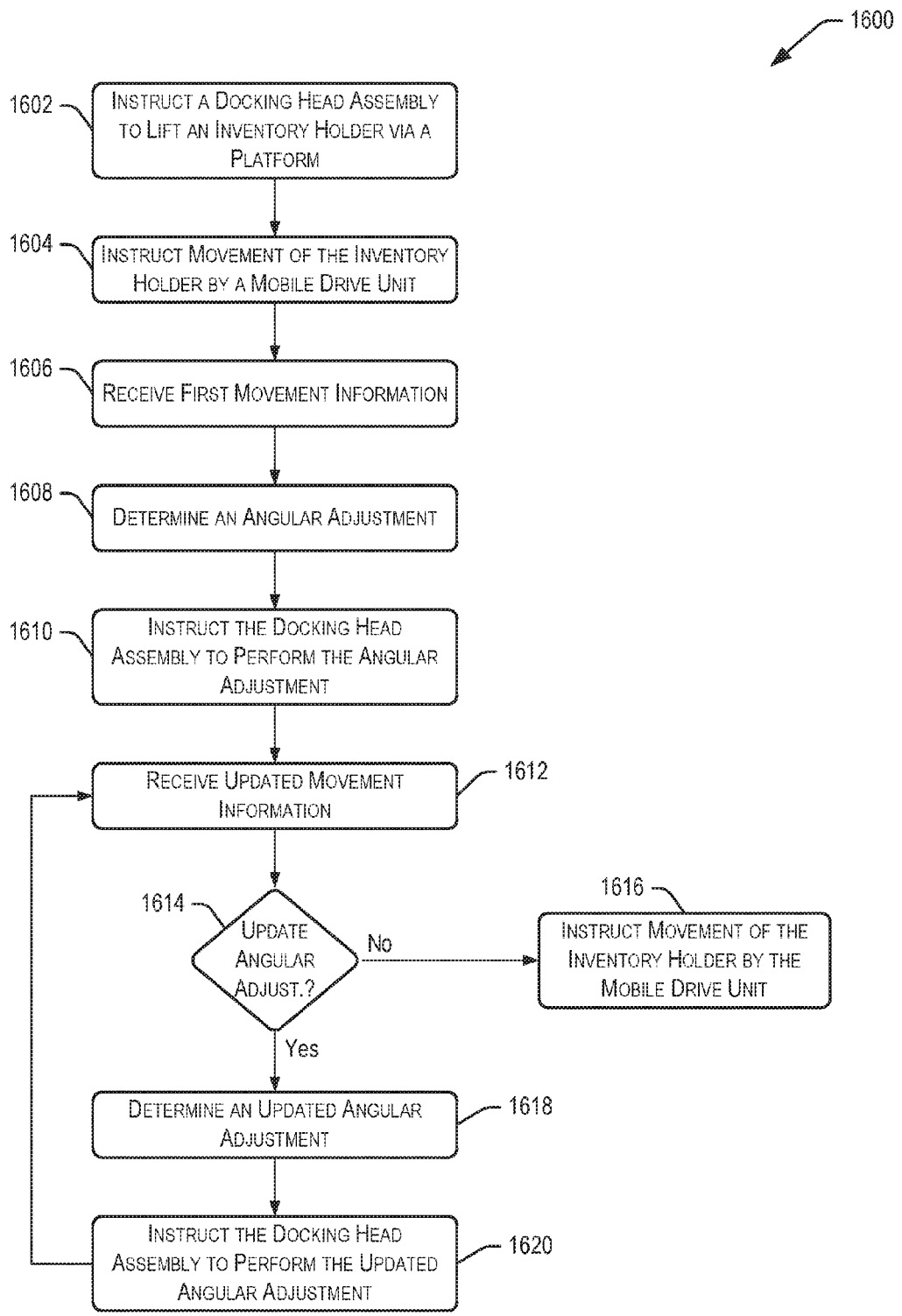
FIG. 16 illustrates a flow diagram depicting example acts for implementing techniques relating to tilting inventory holders for stability control as described herein, according to at least one embodiment.

FIGS. 14, 15, and 16 illustrate example flow diagrams showing respective processes 1400, 1500, and 1600, as described herein. These processes 1400, 1500, and 1600 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 14 depicts the process 1400 including example acts and/or procedures relating to tilting inventory holders for stability control in accordance with at least one example. The management module 15 (FIG. 6) may perform the process 1400 of FIG. 14. The process 1400 begins at 1402 by instructing a docking head assembly to raise a platform into engagement with an inventory holder and lift the inventory holder in an initial orientation. In some examples, instructing the docking head assembly may be performed by the stability module 99 (FIG. 6). In some examples, the docking head assembly raises the platform after a mobile drive unit, to which the docking head assembly is attached, positions itself underneath the inventory holder. In some examples, instructing the docking head assembly may include instructing individual actuator assemblies which are part of the docking head assembly. When in the initial orientation, a bottom surface of the inventory holder may be approximately parallel with a top surface of the mobile drive unit, excluding the docking head assembly. In some examples, the initial orientation may be a neutral position in which characteristics of the inventory holder can be measured by components of the mobile drive unit and in which the mobile drive unit can transport the inventory holder.

At 1404, the process 1400 receives information regarding inventory in the inventory holder. In some examples, receiving the information regarding inventory in the inventory holder may be performed by the stability module 99. In some examples, the information may include inventory information describing the location of inventory items within the inventory holder. For example, the inventory information may indicate that certain bins or shelves within the inventory holder hold certain inventory items. The inventory information may also indicate, or enable access of, information describing characteristics of the certain inventory items held within the inventory holder. For example, the characteristics may indicate weights and dimensions of each inventory item. In some examples, the characteristics may indicate a center of gravity for each inventory item. In any event, the inventory information may include a position of each inventory item with respect to the inventory holder and a weight of the inventory item. In some examples, at least a portion of the inventory information may be derived as a human picker loads inventory items onto the inventory holder and records the positions associated with each inventory item. In some examples, the information may include sensing information sensed by components of the mobile drive unit. For example, the sensing information may be sensed by one or more force sensors, one or more load sensors and/or one or more other sensors described herein. The sensing information may indicate relative forces, relative loads and/or relative positions between the inventory holder and the mobile drive unit when the inventory holder is coupled to the mobile drive unit and lifted to the initial orientation. For example, after the inventory holder is lifted to the initial orientation at 1402, the sensing information may be collected from the one or more sensors described herein while the inventory holder is held in the initial orientation.

At 1406, the process 1400 determines a location of a center of gravity of the inventory holder. In some examples, determining the location of the center of gravity may be performed by the stability module 99. Determining the location of the center of gravity may include determining the location of the center of gravity of the inventory holder based at least in part on the information received at 1404. For example, when the information is inventory information, determining the location of the center of gravity may include calculating the location of the center of gravity based on the positions of inventory items within the inventory holder and characteristics of the inventory items. When the information is sensing information, determining the location of the center of gravity may include calculating the location of the center of gravity based at least in part on the relative forces or loads exerted on, or relative positions of, components of the docking head assembly when the inventory holder is coupled to the mobile drive unit via the platform. In some examples, the location of the center of gravity of the inventory holder may be pre-determined by some other process and determining the location of the center of gravity may include receiving the location from the other process.

At 1408, the process 1400 instructs the docking head assembly to raise or lower the platform relative to a mobile drive unit to an adjusted orientation. In some examples, instructing the docking head assembly to raise or lower the platform may be performed by the stability module 99. Instructing the docking head assembly may include instructing one or more actuator assemblies to raise or lower the platform. In some examples, raising or lowering the platform may include raising or lowering one or more portions of the platform. For example, a front portion of the platform may be raised to cause the inventory holder to tilt backwards, or right-side portion of the platform may be raised to cause the inventory holder to tilt to the left. In some examples, the adjusted orientation is distinct from the initial orientation because, when the platform is in the adjusted orientation, an angle greater than zero is created between the platform and the mobile drive unit. This angle may correspond to any of the one or more tilts described herein. In some examples, the adjusted orientation may include a balanced orientation for the mobile drive unit and the inventory holder where the center of gravity is located in line with a center of gravity for the mobile drive unit or wherein rotational moments in the inventory movement system are balanced to have a neutral stability payload.

FIG. 15 depicts the process 1500 including example acts and/or procedures relating to tilting inventory holders for stability control in accordance with at least one example. The management module 15 (FIG. 6) may perform the process 1500 of FIG. 15. The process 1500 begins at 1502 by instructing a docking head assembly to lift an inventory holder via a platform. In some examples, instructing the docking head assembly may be performed by the stability module 99 (FIG. 6). The docking head assembly may be positioned below the inventory holder by a mobile drive unit prior to lifting the inventory holder. Lifting the inventory holder may include detachably coupling the docking head assembly and the inventory holder.

At 1504, the process 1500 receives sensing information. In some examples, receiving the sensing information may be performed by the stability module 99. Receiving the sensing information may include receiving the sensing information from one or more sensors. The sensing information may be used to determine certain characteristics of the inventory holder. For example, if a platform of the docking head assembly has four load sensors equally disposed around a top surface of the platform, the sensing information may indicate a relative weight of the inventory holder sensed by each of sensors. Based at least in part on the relative weights, it can be determined (e.g., at 1506) whether an inventory movement system including the mobile drive unit and the inventory holder is balanced. In some examples, the sensing information may be used to determine a location of a center of gravity of the inventory holder.

At 1506, the process 1500 determines whether the inventory movement system is balanced. In some examples, the determination at 1506 may be performed by the stability module 99 and may be based at least in part on the sensing information. For example, at 1506, a location of a center of gravity of the inventory holder may be determined. If it is determined that the center of gravity of the inventory holder is located within some threshold distance or percentage away from a center of gravity or centerline of the mobile drive unit, the inventory movement system may be considered balanced. However, if the center of gravity of the inventory holder is located outside of some threshold distance or percentage away from the center of gravity or centerline of the mobile drive unit, the inventory movement system may not be balanced.

If the answer at 1506 is YES, the process 1500 continues to 1508 where the process 1500 instructs movement of the inventory holder. In some examples, instructing movement of the inventory holder may be performed by the route planning module 94 (FIG. 6). Instructing movement of the inventory holder may include instructing movement by a mobile drive unit while the inventory holder is held in an initial orientation corresponding to the position to which it was lifted at 1502. In some examples, instructing movement of the inventory holder may include instructing the mobile drive unit to not exceed a maximum velocity, acceleration, and deceleration. For example, depending on the sensing information received at 1504, the process 1500 may determine that it would not be safe for the inventory holder to be moved faster than a certain maximum velocity. This may be desirable for a situation when an inventory holder is poorly balanced, e.g., if a maximum possible amount of angular adjustment has been made in one or more directions, or if the location of the center of gravity of the inventory holder is at a high vertical distance from the mobile drive unit and/or the surface upon which the mobile drive unit moves, such that adjusting a docking head assembly may not totally balance the system. In this example, the velocity and acceleration of the mobile drive unit may be determined in a manner to ensure that the inventory holder, though being poorly balanced, can nevertheless be moved safely. In some examples, the mounting angle may be adjusted to tip the inventory holder in order to fit into a tight location. For example, the inventory holder may be tipped to the left or right to avoid the top of the inventory holder bumping into other inventory holders, shelves, or other items within a workspace. In this example, the process 1500 may also determine a maximum velocity according to which the mobile drive unit should operate while the inventory holder is tipped. Thus, the determination of the maximum velocity may depend on the extent of the change to the mounting angle. For example, the maximum velocity (and other operational characteristics of the mobile drive unit) may be determined after sensing information has been received and the mounting angle has been determined.

If the answer at 1506 is NO, the process 1500 continues to 1510 where the process 1500 determines an angular adjustment. In some examples, determining the angular adjustment may be performed by the stability module 99. Determining the angular adjustment may include determining the angular adjustment for the platform based at least in part on the sensing information and/or a location of the center of gravity of the inventory holder. For example, the angular adjustment may indicate an angle through which the inventory holder will be tilted via the platform. For example, in the forward and backward directions, the angle may be between 1 and 15 degrees. In the left and right directions, the angle may be between 1 and 5 degrees. It is understood, however, that greater or smaller angles of rotation may be made in both the forward and backward directions and the left and right directions, or any combinations thereof. In some examples, the angular adjustment may also indicate a compound angle (e.g., 2 degrees forward and 2 degrees left).

At 1512, the process 1500 instructs the docking head assembly to perform the angular adjustment. In some examples, instructing the docking head assembly to perform the angular adjustment may be performed by the stability module 99. Instructing the docking head assembly may include instructing one or more actuator assemblies of the docking head assembly to raise or lower portions of the platform in accordance with the angular adjustment. In some examples, performing the angular adjustment may cause the inventory holder to tilt in one or more directions via the platform.

At 1514, the process 1500 receives updated sensing information. In some examples, receiving the updated sensing information may be performed by the stability module 99. Receiving the updated sensing information may include receiving the updated sensing information in a manner similar to that described at 1504. In some examples, the updated sensing information may indicate updated sensing measurements after the angular adjustment has been performed or after the mobile drive unit has moved the inventory holder.

At 1516, the process 1500 determines whether the inventory movement system is balanced. In some examples, the determination at 1516 may be performed by the stability module 99 and may be based at least in part on the updated sensing information. Determining whether the inventory movement system is balanced may be performed in a manner similar to that described at 1506. In some examples, 1516 may be determined during or after the mobile drive unit has moved the inventory holder. Such movement may cause inventory items to shift in the inventory holder resulting in a new location of the center of gravity of the inventory holder. Such movement may include acceleration, deceleration, angular forces, and other types of movement that may affect the stability of the inventory movement system. In this manner, determining whether the system is balanced at 1516 may consider movement information received from one or more movement sensors.

If the answer at 1516 is YES, the process 1500 returns to 1508. If the answer at 1516 is NO, the process 1500 process to 1518. At 1518, the process 1500 determines an updated angular adjustment. In some examples, determining the updated angular adjustment may be performed by the stability module 99. Determining the updated angular adjustment may include determining the updated angular adjustment based at least in part on an updated location of the center of gravity of the inventory holder.

At 1520, the process 1500 instructs the docking head assembly to perform the updated angular adjustment. Instructing the docking head assembly to perform the updated angular adjustment may be performed by the stability module 99. After 1520, the process 1500 proceeds to 1514 where the process 1500 receives updated sensing information. In this manner, the process 1500 may include active balance monitoring and dynamic adjustment to changing balance conditions resulting from movement of the mobile drive unit, shifting of inventory items, external forces on the mobile drive unit and the inventory holder, and any other conditions affecting the balance of the inventory movement system. In some examples, performing the angular adjustment may reduce the number of inventory items that fall out of the inventory holder. In some examples, the angular adjustment may be determined based on inventory information describing the location of the inventory items in the inventory holder and in a manner that attempts to reduce occurrences of inventory items falling out of the inventory holder.

FIG. 16 depicts the process 1600 including example acts and/or procedures relating to tilting inventory holders for stability control in accordance with at least one example. The management module 15 (FIG. 6) may perform the process 1600 of FIG. 16. The process 1600 begins at 1602 by instructing a docking head assembly to lift an inventory holder via a platform. In some examples, instructing the docking head assembly may be performed by the stability module 99 (FIG. 6). The docking head assembly may be positioned below the inventory holder by a mobile drive unit prior to lifting the inventory holder. Lifting the inventory holder may include the detachably coupling the docking head assembly and the inventory holder.

At 1604, the process 1600 instructs movement of the inventory holder by a mobile drive unit. In some examples, instructing movement of the inventory holder by the mobile drive unit may be performed by the route planning module 94 (FIG. 6). Instructing movement of the inventory holder may include instructing the mobile drive unit to transport the inventory holder to an inventory station or other location. In some examples, such movement may be typical to transporting inventory items between inventory stations within an inventory system. Such movement may include linear movement, angular movement, inclined and declined movement, and any other suitable movement.

At 1606, the process 1600 receives first movement information. In some examples, receiving the first movement information may be performed by the stability module 99. Receiving the first movement information may include receiving the first movement information from one or more movement sensors. The first movement information may indicate movements of the mobile drive unit as they occur. Thus, the first movement information may be received in real-time or about real-time.

At 1608, the process 1600 determines an angular adjustment. In some examples, determining the angular adjustment may be performed by the stability module 99. Determining the angular adjustment may include determining the angular adjustment based at least in part on the first movement information. For example, if the first movement information indicates a deceleration of the mobile drive unit, the determined angular adjustment may be include tilting the platform of the docking head assembly in a direction opposite the direction of travel of the mobile drive unit to account for the deceleration. Determining the angular adjustment may include determining an angle of rotation that attempts to balance all rotational moments in the inventory movement system.

At 1610, the process 1600 instructs the docking head assembly to perform the angular adjustment. In some examples, instructing the docking head assembly to perform the angular adjustment may be performed by the stability module 99. Instructing the docking head assembly may include instructing one or more actuator assemblies to tilt the platform in accordance with the angular adjustment. Instructing the docking head assembly may be performed dynamically in response to receiving movement information.

At 1612, the process 1600 receives updated movement information. In some examples, receiving the updated movement information may be performed by the stability module 99. Receiving the updated movement information may include receiving updated movement information from the one or more movement sensors. In some examples, the updated movement information is received on an ongoing basis while the mobile drive unit is coupled to the inventory holder.

At 1614, the process 1600 determines whether to update the angular adjustment. In some examples, determining whether to update the angular adjustment may be performed by the stability module 99. Determining whether to update the angular adjustment may include determining whether the location of the center of gravity of the inventory holder has changed. For example, if the location of the center of gravity has changed, the angular adjustment may need to be updated to maintain stability in the inventory movement system. In some examples, determining whether to update the angular adjustment may be based on receiving updated movement information that indicates different movement conditions compared to when the angular adjustment was determined at 1608.

If the answer at 1614 is NO, the process 1600 proceeds to 1616 where the process 1600 instructs movement of the inventory holder by the mobile drive unit. In some examples, instructing movement of the inventory holder by the mobile drive unit may be performed by the route planning module 94. Instructing movement of the inventory holder may include instructing the mobile drive unit to transport the inventory holder similar to 1604. In some examples, instructing movement of the inventory holder may include instructing the mobile drive unit to not exceed a maximum velocity, acceleration, and deceleration. For example, depending on the updated movement information received at 1612, the process 1600 may determine that it would not be safe for the inventory holder to be moved faster than a certain maximum velocity. This may be desirable for a situation when an inventory holder is poorly balanced, as described above, such that adjusting a docking head assembly may not totally balance the system. In this example, the velocity and acceleration of the mobile drive unit may be determined in a manner to ensure that the inventory holder, though being poorly balanced, can nevertheless be moved safely.

If the answer at 1614 is YES, the process 1600 proceeds to 1618 where the process 1600 determines an updated angular adjustment. In some examples, determining the updated angular adjustment may be performed by the stability module 99. Determining the updated angular adjustment may include determining the updated angular adjustment based on the updated movement information. In some examples, determining the updated angular adjustment may be determined in a manner similar to 1608.

At 1620, the process 1600 instructs the docking head assembly to perform the updated angular adjustment. In some examples, instructing the docking head assembly to perform the updated angular adjustment may be performed by the stability module 99. Instructing the docking head assembly may include instructing one or more actuators to tilt the platform in accordance with the updated angular adjustment. Instructing the docking head assembly may be performed dynamically in response receiving the updated movement information.

Then, the process 1600 returns to 1612 where the process 1600 receives further updated movement information.

Figure 17:
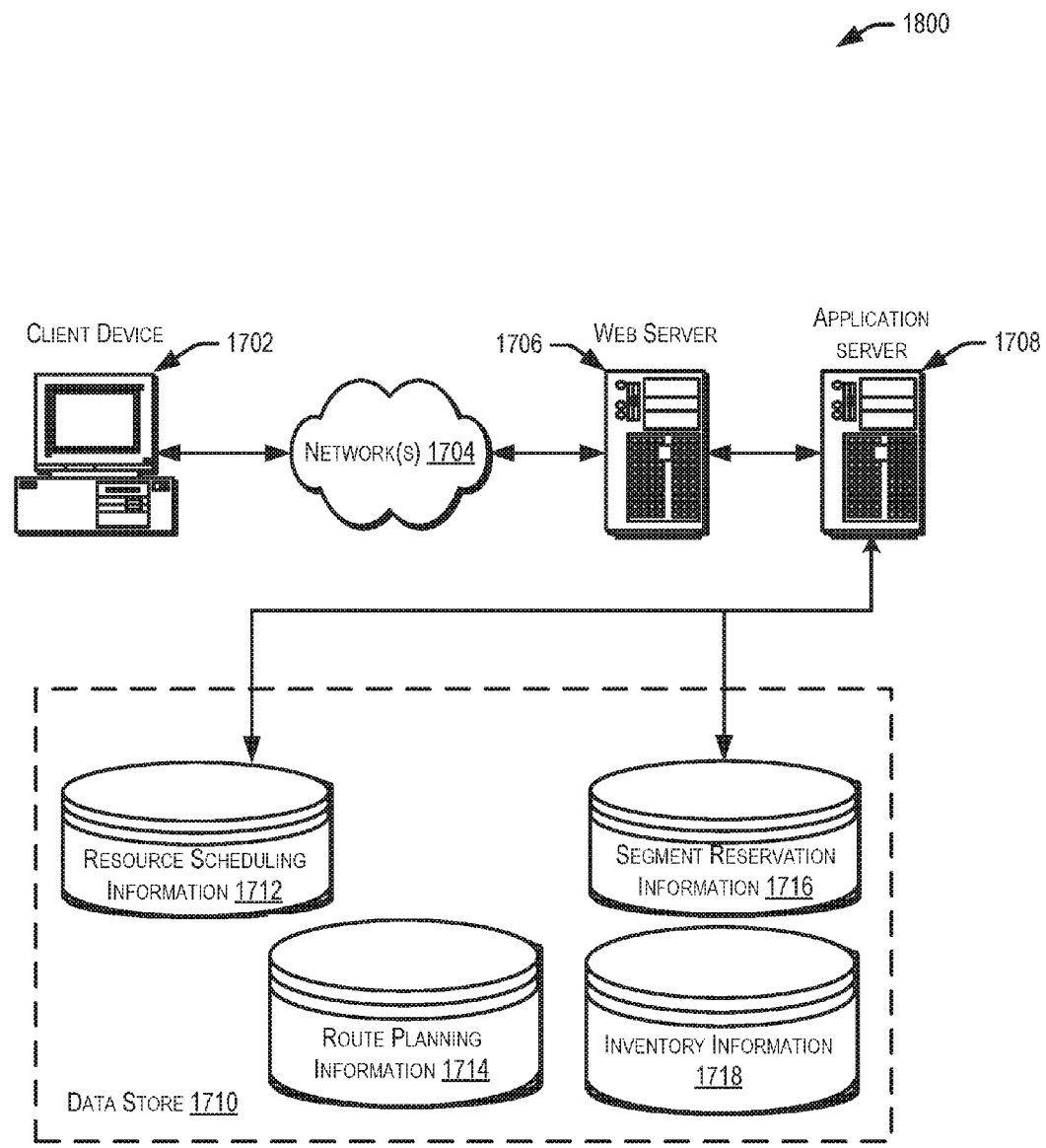
FIG. 17 illustrates an environment in which various features of the inventory system can be implemented, according to at least one embodiment.

FIG. 17 illustrates aspects of an example environment 1700 for implementing aspects in accordance with various embodiments. As will be appreciated, although a Web-based environment is used for purposes of explanation, different environments may be used, as appropriate, to implement various embodiments. The environment includes an electronic client device 1702, which can include any appropriate device operable to send and receive requests, messages, or information over an appropriate network 1704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1706 for receiving requests and serving content in response thereto, although for other networks an alternative device serving a similar purpose could be used, as would be apparent to one of ordinary skill in the art.

The illustrative environment includes at least one application server 1708 and a data store 1710. It should be understood that there can be several application servers, layers, or other elements, processes or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1702 and the application server 1708, can be handled by the Web server. It should be understood that the Web and application servers are not required and are merely example components, as structured code discussed herein can be executed on any appropriate device or host machine as discussed elsewhere herein.

The data store 1710 can include several separate data tables, databases or other data storage mechanisms and media for storing data relating to a particular aspect. For example, the data store illustrated includes mechanisms for storing information which can be used by modules described herein, such as resource scheduling information 1712, route planning information 1714, segment reservation information 1716, and/or inventory information 1718. It should be understood that there can be many other aspects that may need to be stored in the data store, such as for page image information and to access right information, which can be stored in any of the above-listed mechanisms as appropriate or in additional mechanisms in the data store 1710. The data store 1710 is operable, through logic associated therewith, to receive instructions from the application server 1708 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the description herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the environment 1700 in FIG. 17 should be taken as being illustrative in nature and not limiting to the scope of the description.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infra-red network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including, without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the description and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the description as set forth in the claims.

Other variations are within the spirit of the present description. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this description are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents cited herein are hereby incorporated by reference to the same extent as if each reference were individually and specifically indicated to be incorporated by reference and were set forth in its entirety herein.

What is claimed is:

1. A mobile drive unit, comprising:
   a frame;
   a docking head assembly comprising:
      a platform moveably attached to the frame via a set of actuator assemblies that is configured to raise and lower the platform and to tilt the platform; and
      a sensor disposed at or adjacent to a top surface of the platform; and
   a management module configured to:
      receive sensing information from the sensor after the set of actuator assemblies has raised the platform so as to lift a holder structure into an initial orientation, the sensing information indicating at least one force exerted by the holder structure on the top surface of the platform when the holder structure is in the initial orientation;
      determine, based at least in part on the sensing information, one or more characteristics of a load of the holder structure; and
      cause, based at least in part on the one or more characteristics of the load, at least one actuator assembly of the set of actuator assemblies to tilt the platform into an adjusted orientation, the adjusted orientation being distinct from the initial orientation.

2. The mobile drive unit of claim 1, wherein the management module is further configured to determine, based at least in part on the one or more characteristics of the load, a tilting angle for tilting the platform from the initial orientation to the adjusted orientation.

3. The mobile drive unit of claim 2, wherein causing the at least one actuator assembly to tilt the platform comprises causing the at least one actuator assembly to tilt the platform based at least in part on the tilting angle.

4. The mobile drive unit of claim 1, further comprising a drive motor, and wherein the management module is further configured to:
   cause the drive motor to move the holder structure along a surface;
   in response to the drive motor moving the holder structure along the surface, receive updated sensing information from the sensor;
   determine, based at least in part on the updated sensing information, one or more updated characteristics of the load the holder structure; and
   cause, based at least in part on the one or more updated characteristics, the at least one actuator assembly to tilt the platform to an updated adjusted orientation, the updated adjusted orientation being distinct from the initial orientation and the adjusted orientation.

5. The mobile drive unit of claim 1, wherein the one or more characteristics comprise a location of a center of gravity of the holder structure.

6. A computer-implemented method, comprising:
   causing a docking head assembly of a mobile drive unit to couple with a holder structure by adjusting a set of actuator assemblies of the docking head assembly to raise a platform of the docking head assembly into a first orientation in which the platform supports the holder structure;
   receiving information indicating a load of the holder structure; and
   causing, based at least in part on the load, the docking head assembly to tilt the holder structure by adjusting at least one actuator assembly to raise or lower a portion of the platform relative to other portions of the platform into a second orientation that is distinct from the first orientation.

7. The computer-implemented method of claim 6, wherein the docking head assembly comprises one or more sensors configured to provide sensing information at least when the holder structure is coupled to the mobile drive unit via the platform, and wherein the information comprises the sensing information.

8. The computer-implemented method of claim 7, wherein the one or more sensors are disposed about a top surface of the platform, and wherein the sensing information indicates one or more relative pressures or relative forces exerted by the holder structure on the top surface of the platform when the holder structure is coupled to the mobile drive unit via the platform.

9. The computer-implemented method of claim 7, wherein the one or more sensors are configured to measure displacement of the at least one actuator assembly, and wherein the sensing information indicates the displacement of the at least one actuator assembly when the holder structure is detachably coupled to the mobile drive unit via the platform.

10. The computer-implemented method of claim 6, wherein the information comprises item location information identifying locations of one or more items stowed in the holder structure.

11. The computer-implemented method of claim 6, wherein the set of actuator assemblies comprises a first scissor actuator assembly and a second scissor actuator assembly, the first scissor actuator assembly configured to raise and lower a front portion of the platform relative to a rear portion of the platform, the second scissor actuator assembly configured to raise and lower the rear portion of the platform relative to the front portion of the platform.

12. The computer-implemented method of claim 6, wherein the set of actuator assemblies comprises three or more linear actuator assemblies configured to raise or lower respective portions of the platform relative to other portions of the platform to cause the platform to tilt in at least one of a forward direction, a backward direction, or a sideward direction.

13. The computer-implemented method of claim 6, wherein the docking head assembly comprises a track bar that is attached to the platform and a frame of the mobile drive unit, the track bar at least providing lateral stability for the platform.

14. The computer-implemented method of claim 6, further comprising determining, based at least in part on the load, a tilting angle for tilting the platform, the tilting angle comprising a rotation of the platform from the first orientation to the second orientation.

15. A mobile drive unit, comprising:
a drive motor;
a docking head assembly comprising a platform, and configured to tilt the platform in at least one direction; and
a management module configured to:
cause the drive motor to move along a surface when the mobile drive unit is supporting a holder structure via the platform, the holder structure configured to hold one or more items;
receive information regarding the one or more items held in the holder structure;
determine, based at least in part on the information, an angular adjustment for the platform; and
cause the docking head assembly to perform the angular adjustment by raising or lowering at least one portion of the platform, the angular adjustment changing an angle of the platform relative to the mobile drive unit.

16. The mobile drive unit of claim 15, wherein:
the management module is further configured to identify a location of a center of gravity of the holder structure based at least in part on the information; and
determining the angular adjustment comprises determining the angular adjustment based at least in part on the location of the center of gravity.

17. The mobile drive unit of claim 15, wherein the information comprises:
mass information identifying a mass value of the one or more items; and
item location information identifying locations of the one or more items with respect to the holder structure.

18. The mobile drive unit of claim 15, wherein causing the docking head assembly to perform the angular adjustment comprises causing the docking head assembly to perform an adjustment to an orientation of a center of gravity of the holder structure with respect to the mobile drive unit.

19. The mobile drive unit of claim 15, wherein:
the management module is further configured to receive movement information regarding movement of the mobile drive unit; and
determining the angular adjustment for the platform is further based at least in part on the movement information.

20. The mobile drive unit of claim 15, wherein the management module is further configured to:
receive movement information regarding movement of the mobile drive unit;
determine, based at least in part on the movement information, an updated angular adjustment for the platform; and
cause the docking head assembly to perform the updated angular adjustment by raising or lowering at least a second portion of the platform, the updated angular adjustment changing the angle of the platform relative to the mobile drive unit.

* * * * *